US010476618B2

(12) United States Patent
Farra et al.

(10) Patent No.: US 10,476,618 B2
(45) Date of Patent: *Nov. 12, 2019

(54) ACCURATE SYNCHRONIZATION AS A SERVICE

(71) Applicant: CenturyLink Intellectual Property LLC, Broomfield, CO (US)

(72) Inventors: Jeff Farra, Castle Rock, CO (US); Paul Johnson, Littleton, CO (US); Thomas Schwengler, Lakewood, CO (US)

(73) Assignee: CenturyLink Intellectual Property LLC, Broomfield, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/397,829

(22) Filed: Apr. 29, 2019

(65) Prior Publication Data

US 2019/0253170 A1    Aug. 15, 2019

Related U.S. Application Data

(63) Continuation of application No. 16/030,326, filed on Jul. 9, 2018, now Pat. No. 10,277,347, which is a
(Continued)

(51) Int. Cl.
*H04B 10/00* (2013.01)
*H04J 3/06* (2006.01)
(Continued)

(52) U.S. Cl.
CPC ........ *H04J 3/0673* (2013.01); *H04B 10/0793* (2013.01); *H04J 3/0644* (2013.01);
(Continued)

(58) Field of Classification Search
CPC .... H04B 10/0793; H04J 14/02; H04J 14/021; H04J 14/0283; H04J 3/0673; H04J 3/0644;
(Continued)

(56) References Cited

U.S. PATENT DOCUMENTS 10,020,905 B2 *   7/2018   Farra ................. H04B 10/0793
10,277,347 B2 *   4/2019   Farra ................. H04B 10/0793
(Continued)

FOREIGN PATENT DOCUMENTS

JP          2013-514688         4/2013

OTHER PUBLICATIONS

International Preliminary Report on Patentability, dated Oct. 23, 2018, Int'l Appl. No. PCT/US17/028282, Int'l Filing date Apr. 19, 2017; 9 pgs.
(Continued)

*Primary Examiner* — Hanh Phan

(57) ABSTRACT

Novel tools and techniques are provided for implementing network timing functionality. In some embodiments, a grand master clock(s) might receive a first timing signal from a global positioning system ("GPS") source via a GPS antenna(s), and might send a second timing signal (which might be based at least in part on the first timing signal) to a slave clock(s), in some cases, via one or more network elements or the like. A computing system might calculate various transmission times for the second timing signal to be transmitted between the grand master clock(s) and the slave clock(s), and might calculate any time delay differences in the transmission times, might generate a third timing signal based at least in part on the calculated time delay differences (if any), and might send the third timing signal to one or more network elements, thereby providing Accurate Synchronization as a Service ("ASaaS") functionality.

20 Claims, 11 Drawing Sheets

Related U.S. Application Data continuation of application No. 15/393,556, filed on Dec. 29, 2016, now Pat. No. 10,020,905.

(60) Provisional application No. 62/324,655, filed on Apr. 19, 2016.

(51) Int. Cl.
 *H04B 10/079* (2013.01)
 *H04J 14/02* (2006.01)
 *H04W 56/00* (2009.01)

(52) U.S. Cl.
 CPC ....... *H04J 14/021* (2013.01); *H04W 56/0045* (2013.01); *H04J 3/0667* (2013.01); *H04J 3/0682* (2013.01)

(58) Field of Classification Search
 CPC ...... H04J 3/0679; H04J 3/0667; H04J 3/0658; H04J 3/0635; H04J 3/0661; H04J 3/0682
 USPC ..... 398/154, 155, 158, 159, 98, 100, 58, 79, 398/66, 68, 72, 99, 115; 370/350, 503, 370/395.62, 507, 516; 375/354, 356, 376, 375/362, 145, 149; 455/12.1, 13.1, 422, 455/527, 561, 502, 503

See application file for complete search history.

(56) References Cited

U.S. PATENT DOCUMENTS

| | | |
|---|---|---|
| 2004/0062278 A1 | 4/2004 | Hadzic et al. |
| 2009/0147806 A1 | 6/2009 | Brueckeimer |
| 2011/0293023 A1* | 12/2011 | Wu .......................... G04G 7/00 375/259 |
| 2012/0170631 A1 | 7/2012 | Liu |
| 2015/0104167 A1 | 4/2015 | Bottari et al. |
| 2015/0236807 A1* | 8/2015 | Mizrahi ................ H04J 3/0641 370/503 |
| 2017/0063481 A1* | 3/2017 | Pauwels ................ H04J 3/0673 |
| 2017/0302392 A1 | 10/2017 | Farra et al. |
| 2018/0331772 A1 | 11/2018 | Farra et al. |

OTHER PUBLICATIONS

International Search Report and Written Opinion prepared by the ISA/KR as Interntional Searching Authority for PCT International Patent Appliation No. PCT/US2017/028282 dated Jul. 25, 2017; 12 pages.

* cited by examiner

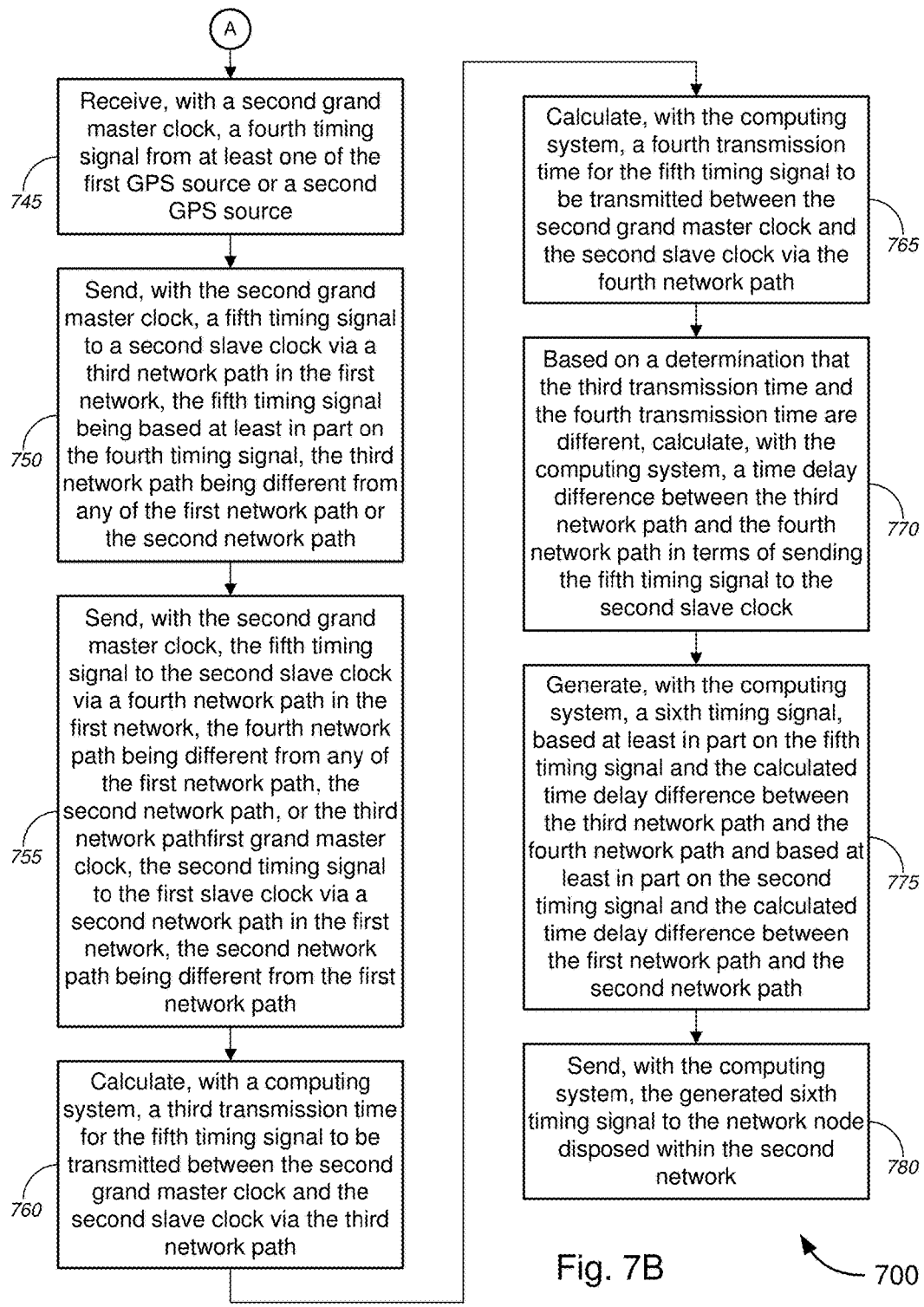
Fig. 7B — 700

ACCURATE SYNCHRONIZATION AS A SERVICE

CROSS-REFERENCES TO RELATED APPLICATIONS

This application is a continuation application of U.S. patent application Ser. No. 16/030,326 (the "'326 application"), filed Jul. 9, 2018 by Jeff Farra et al. and titled, "Accurate Synchronization as a Service", which is a continuation application of U.S. patent application Ser. No. 15/393,556 (the "'556 application") (now U.S. Pat. No. 10,020,905), filed Dec. 29, 2016 by Jeff Farra et al. and titled, "Accurate Synchronization as a Service" which claims priority to U.S. Patent Application Ser. No. 62/324,655 (the "'655 application"), filed Apr. 19, 2016 by Jeff Farra et al. and titled, "Accurate Synchronization as a Service—Timing Source for Virtual Network Functions", all of which are incorporated herein by reference in their entirety for all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to methods, systems, apparatus, and computer software for implementing network timing functionality, and, in particular embodiments, to methods, systems, apparatus, and computer software for implementing Accurate Synchronization as a Service ("ASaaS") functionality.

BACKGROUND

As wireless carriers enhance their networks towards 5G/LTE-A or the like, for example, increasingly precise timing are required for their backhaul networks and precise time synchronization is required between their backhaul and fronthaul networks. Although current networks utilize some form of providing timing or time synchronization to network elements in the networks, some such networks do not appear to provide extremely accurate or precise timing or time synchronization, which are required due to variability in exceedingly more complex networks.

Hence, there is a need for more robust and scalable solutions for implementing network timing functionality, and, in particular embodiments, to methods, systems, apparatus, and computer software for implementing Accurate Synchronization as a Service ("ASaaS") functionality.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

FIGS. 7A and 7B are flow diagrams illustrating a method for implementing ASaaS functionality, in accordance with various embodiments.

DETAILED DESCRIPTION OF CERTAIN EMBODIMENTS

Overview

Figure 1:
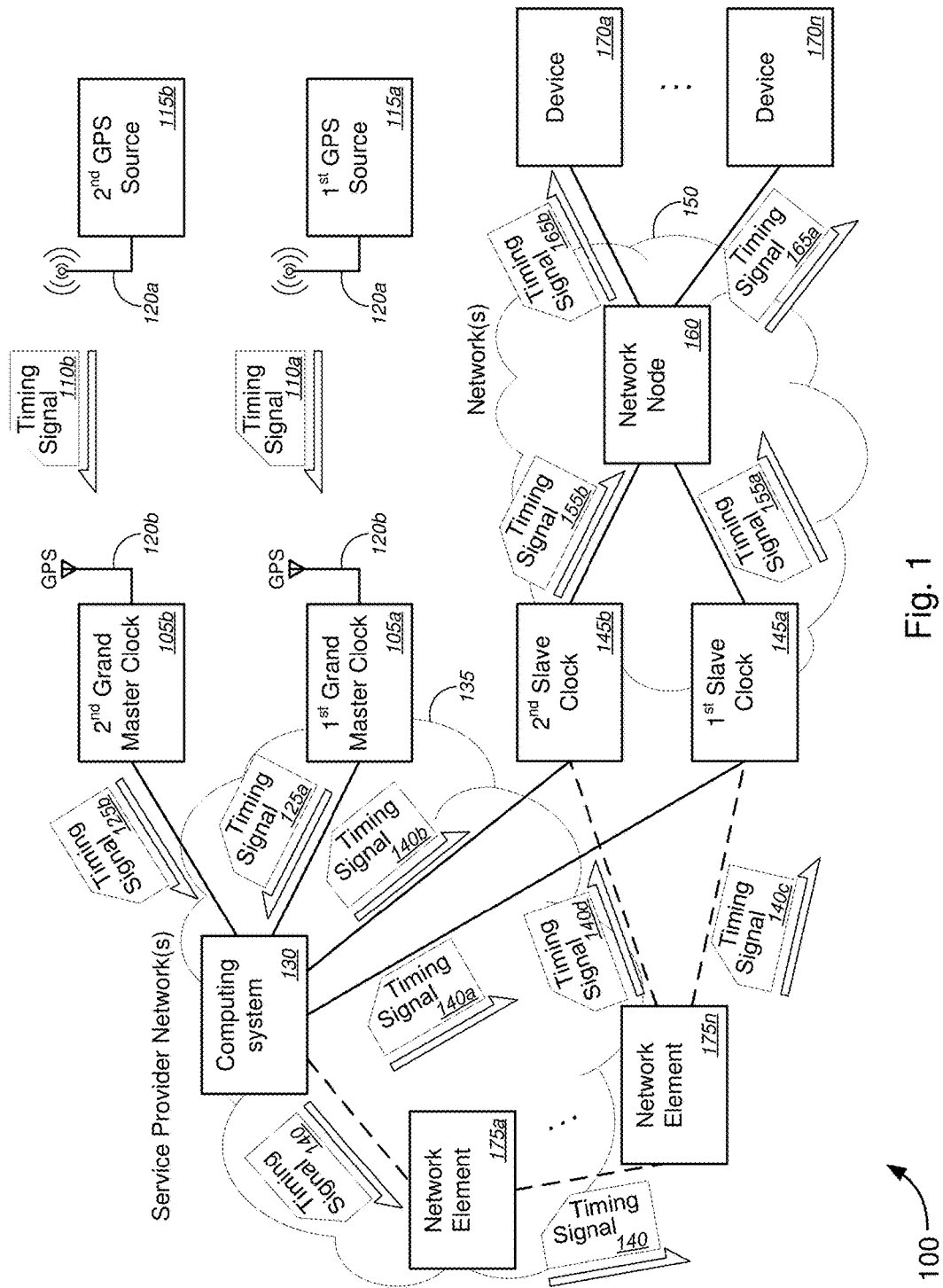
FIG. 1 is a schematic diagram illustrating a system for implementing Accurate Synchronization as a Service ("ASaaS") functionality, in accordance with various embodiments.

Various embodiments provide tools and techniques for implementing network timing functionality, and, in particular embodiments, to methods, systems, apparatus, and computer software for implementing Accurate Synchronization as a Service ("ASaaS") functionality.

In various embodiments, a grand master clock(s) might receive a first timing signal from a global positioning system ("GPS") source via a GPS antenna(s), and might send a second timing signal (which might be based at least in part on the first timing signal) to a slave clock(s), in some cases, via one or more network elements or the like. A computing system might calculate various transmission times for the second timing signal to be transmitted between the grand master clock(s) and the slave clock(s), and might calculate any time delay differences in the transmission times, might generate a third timing signal based at least in part on the calculated time delay differences (if any), and might send the third timing signal to one or more network elements, thereby providing Accurate Synchronization as a Service ("ASaaS") functionality.

The various embodiments provide applications needing more accurate timing information with the above-mentioned timing signals for improving synchronization between network elements, for providing timing to virtual network elements and virtual network functions ("VNFs"). The application might be implemented for a variety of new services, including, but not limited to, wireless networking for 5G networks, centralized radio access networks ("C-RANs"), and/or the like, including their virtual units (if any). The method and system described herein may be applied to host wireless and other networking hardware and VM-ware in hosted space and in central offices. In some cases, the various embodiments might be applicable to wholesale services, transport and other network services, hosting, and central office deployments, or data centers requiring specific timing and synchronization information (or source).

In some embodiments, at least one of the first timing signal, or the second timing signal, and/or the third timing signal might each comprise a precision time protocol ("PTP") timing signal, which might include, but is not limited to, frequency information, phase information, time of day information, and/or the like.

In some cases, transport systems might be used to deliver accurate timing, which, in some cases, might utilize open-loop feedback information or closed-loop feedback information, thereby compensating for variations in the network path. In some instances, accurate timing sources (e.g., GPS sources in or outside the network) might be used. One or more grand master clocks might each transmit timing information a slave clock(s), which might be co-located (e.g., in a base band unit ("BBU") hotel, a wireless service provider network, or the like). There might usually be two master clocks and two slave clocks for redundancy (although one of each might be used where appropriate). Time delay difference between paths might be calculated (e.g., node A to node Z and node Z to node A, or the like). An open-loop system (or a closed-loop system) might be in place to perform the measurement at a given frequency (which might be adjustable by software). The difference is taken into account for accurate timing. PTP might actively transmit time of day information, frequency information, and phase information.

For layer 2 and layer 3 networks, the various transport systems described herein, in some cases, might be used to deliver accurate timing, which, in some cases, might utilize open-loop feedback information or closed-loop feedback information, thereby compensating for variations in the network path. In some instances, accurate timing sources (e.g., GPS sources in or outside the network) might be used. One or more grand master clocks might each transmit timing information a slave clock(s), which might be co-located (e.g., in a BBU hotel, a wireless service provider network, or the like). Time delay difference between paths might be calculated (e.g., node A to node Z and node Z to node A, or the like). An open-loop system (or a closed-loop system) might be in place to perform the measurement at a given frequency (which might be adjustable by software). The difference is taken into account for accurate timing. PTP might actively transmit time of day information, frequency information, and phase information. Due to the variability in the networks, the differences are generally larger for the layer 2 and layer 3 networks compared to the layer 1 networks. In some cases, the system might (establish and) enforce a path as static (i.e., unchanging, etc.) and as high priority as the networks allow. In some instances, the system might guarantee that physical paths and routes remain the same. The system might also guarantee the highest quality service to transport timing information. This ensures smallest levels of variations in the delay—in either direction. There might usually be two master clocks and two slave clocks for redundancy (although one of each might be used where appropriate). In some embodiments, the two paths master clocks-to-slave clocks remain independent and fixed in time.

The following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

The tools provided by various embodiments include, without limitation, methods, systems, and/or software products. Merely by way of example, a method might comprise one or more procedures, any or all of which are executed by a computer system. Correspondingly, an embodiment might provide a computer system configured with instructions to perform one or more procedures in accordance with methods provided by various other embodiments. Similarly, a computer program might comprise a set of instructions that are executable by a computer system (and/or a processor therein) to perform such operations. In many cases, such software programs are encoded on physical, tangible, and/or non-transitory computer readable media (such as, to name but a few examples, optical media, magnetic media, and/or the like).

Various embodiments described herein, while embodying (in some cases) software products, computer-performed methods, and/or computer systems, represent tangible, concrete improvements to existing technological areas, including, without limitation, network virtualization technology, network configuration technology, virtualized network function technology, Internet of Things ("IoT") technology, machine-to-machine communication, network timing technology, network synchronization technology, and/or the like. In other aspects, certain embodiments, can improve the functioning of user equipment or systems themselves (e.g., networks, network elements, etc.), for example, by sending timing signals between each of one or more grand master clocks and corresponding each of one or more slave clocks via various network paths between the master clock(s) and the slave clock(s), calculating time delay differences (if any) along the various network paths (in one or both directions), generating a timing signal that takes into account the time delay differences (if any), and sending the generated timing signal to the various network elements and devices requiring accurate timing or accurate time synchronization, and/or the like. In particular, to the extent any abstract concepts are present in the various embodiments, those concepts can be implemented as described herein by devices, software, systems, and methods that involve specific novel functionality (e.g., steps or operations), such as sending timing signals between each of one or more grand master clocks and corresponding each of one or more slave clocks via various network paths between the master clock(s) and the slave clock(s), calculating time delay differences (if any) along the various network paths (in one or both directions), generating a timing signal that takes into account the time delay differences (if any), and sending the generated timing signal to the various network elements and devices requiring accurate timing or accurate time synchronization, and/or the like, which improves the interaction amongst the various network elements and devices across both the backhaul or back haul network and the fronthaul or front haul network, improves the functionality of the various networks, and/or the like, to name a few examples, that extend beyond mere conventional computer processing operations. These functionalities can produce tangible results outside of the implementing computer system, including, merely by way of example, improved functionality of the various networks and of the various network elements and devices in the various networks, and/or the like, at least some of which may be observed or measured by customers and/or service providers.

In an aspect, a method might be provided for implementing accurate synchronization as a service ("ASaaS") functionality. The method might comprise receiving, with a first grand master clock, a first timing signal from a first global positioning system ("GPS") source; sending, with the first grand master clock, a second timing signal to a first slave clock via a first network path in a first network, the second timing signal being based at least in part on the first timing signal; and sending, with the first grand master clock, the second timing signal to the first slave clock via a second network path in the first network, the second network path being different from the first network path. The method might also comprise calculating, with a computing system, a first transmission time for the second timing signal to be transmitted between the first grand master clock and the first slave clock via the first network path; calculating, with the computing system, a second transmission time for the second timing signal to be transmitted between the first grand master clock and the first slave clock via the second network path; and based on a determination that the first transmission time and the second transmission time are different, calculating, with the computing system, a time delay difference between the first network path and the second network path in terms of sending the second timing signal to the first slave clock. The method might further comprise generating, with the computing system, a third timing signal, based at least in part on the second timing signal and the calculated time delay difference between the first network path and the second network path; and sending, with the computing system, the generated third timing signal to a network node disposed within a second network.

In some embodiments, the third timing signal might comprise a precision time protocol ("PTP") timing signal, the PTP timing signal comprising frequency information, phase information, and time of day information. In some cases, the second network might be a wireless carrier network associated with a wireless carrier. The network node might comprise at least one base band unit ("BBU"). The first slave clock and the at least one BBU might be disposed within at least one of a central office or a BBU hotel associated with the wireless carrier, and the PTP timing signal might be used to provide timing and synchronization between backhaul and fronthaul networks associated with the wireless carrier.

In some instances, the first network and the second network might be the same network, and the first grand master clock might be disposed within the at least one of the central office or the BBU hotel associated with the wireless carrier. The at least one of the central office or the BBU hotel might comprise at least one rooftop cable penetration through which a cable provides the first timing signal to the first grand master clock, via an optical converter, from at least one GPS antenna that communicatively couples to the first GPS source.

According to some embodiments, the PTP timing signal might be a virtual PTP timing signal, and the at least one BBU might comprise at least one virtual BBU ("vBBU"). The first slave clock might comprise a timing virtual machine ("VM") that is created in each of at least one pod, and the first grand master clock and the at least one pod might be disposed within the at least one of the central office or the BBU hotel associated with the wireless carrier. The first grand master clock might communicatively couple with the at least one pod via optical fiber communication. The at least one of the central office or the BBU hotel might comprise at least one rooftop cable penetration through which a cable provides the first timing signal to the first grand master clock from at least one GPS antenna that communicatively couples to the first GPS source, and the at least one vBBU might receive time information and time synchronization, via the virtual PTP timing signal, directly from the at least one pod.

Merely by way of example, in some embodiments, the method might further comprise receiving, with a second grand master clock, a fourth timing signal from at least one of the first GPS source or a second GPS source; sending, with the second grand master clock, a fifth timing signal to a second slave clock via a third network path in the first network, the fifth timing signal being based at least in part on the fourth timing signal, the third network path being different from any of the first network path or the second network path; and sending, with the second grand master clock, the fifth timing signal to the second slave clock via a fourth network path in the first network, the fourth network path being different from any of the first network path, the second network path, or the third network path. The method might also comprise calculating, with the computing system, a third transmission time for the fifth timing signal to be transmitted between the second grand master clock and the second slave clock via the third network path; calculating, with the computing system, a fourth transmission time for the fifth timing signal to be transmitted between the second grand master clock and the second slave clock via the fourth network path; and based on a determination that the third transmission time and the fourth transmission time are different, calculating, with the computing system, a time delay difference between the third network path and the fourth network path in terms of sending the fifth timing signal to the second slave clock. The method might further comprise generating, with the computing system, a sixth timing signal, based at least in part on the fifth timing signal and the calculated time delay difference between the third network path and the fourth network path and based at least in part on the second timing signal and the calculated time delay difference between the first network path and the second network path; and sending, with the computing system, the generated sixth timing signal to the network node disposed within the second network.

In some cases, the first network path might comprise a first sequence of a first plurality of network elements through which the second timing signal is sent. The second network path might comprise a second sequence of the same first plurality of network elements through which the second timing signal is sent, and the second sequence might be the opposite of the first sequence. Similarly, the third network path might comprise a third sequence of a second plurality of network elements through which the fifth timing signal is sent. The fourth network path might comprise a fourth sequence of the same second plurality of network elements through which the fifth timing signal is sent, and the fourth sequence might be the opposite of the third sequence.

In some embodiments, the first network path and the second network path might each comprise open systems interconnection ("OSI") model layer 3 network devices, routers, and switches, and the first grand master clock might be disposed within a service provider central office in the first network. In some instances, the first network path and the second network path might each comprise OSI model layer 2 network devices and switches, and the first grand master clock might be disposed within a service provider central office in the first network. In some cases, the first network path and the second network path might each comprise OSI model 1 network devices, and the first grand master clock might be communicatively coupled with a reconfigurable optical add-drop multiplexer ("ROADM").

According to some embodiments, sending the generated third timing signal to the network node might comprise sending, with the computing system, the generated third timing signal to the network node disposed within the second network via optical fiber communication between the computing system and the network node. In some cases, each of the first network path and the second network path might be static network paths.

In another aspect, a system might be provided for implementing accurate synchronization as a service ("ASaaS") functionality. The system might comprise a first grand master clock and a computing system. The first grand master clock might comprise a first processor and a first non-transitory computer readable medium communicatively coupled to the at least one first processor. The first non-transitory computer readable medium might have stored thereon computer software comprising a first set of instructions that, when executed by the at least one first processor, causes the first grand master clock to: receive a first timing signal from a first global positioning system ("GPS") source; send a second timing signal to a first slave clock via a first network path in a first network, the second timing signal being based at least in part on the first timing signal; and send the second timing signal to the first slave clock via a second network path in the first network, the second network path being different from the first network path.

The computing system might comprise at least one second processor and a second non-transitory computer readable medium communicatively coupled to the at least one second processor. The second non-transitory computer readable medium might have stored thereon computer software comprising a second set of instructions that, when executed by the at least one second processor, causes the computing system to: calculate a first transmission time for the second timing signal to be transmitted between the first grand master clock and the first slave clock via the first network path; calculate a second transmission time for the second timing signal to be transmitted between the first grand master clock and the first slave clock via the second network path; based on a determination that the first transmission time and the second transmission time are different, calculate a time delay difference between the first network path and the second network path in terms of sending the second timing signal to the first slave clock; generate a third timing signal, based at least in part on the second timing signal and the calculated time delay difference between the first network path and the second network path; and send the generated third timing signal to a network node disposed within a second network.

In some embodiments, the third timing signal might comprise a precision time protocol ("PTP") timing signal, the PTP timing signal comprising frequency information, phase information, and time of day information. In some cases, the second network might be a wireless carrier network associated with a wireless carrier. The network node might comprise at least one base band unit ("BBU"). The first slave clock and the at least one BBU might be disposed within at least one of a central office or a BBU hotel associated with the wireless carrier, and the PTP timing signal might be used to provide timing and synchronization between backhaul and fronthaul networks associated with the wireless carrier.

In some instances, the first network and the second network might be the same network, and the first grand master clock might be disposed within the at least one of the central office or the BBU hotel associated with the wireless carrier. The at least one of the central office or the BBU hotel might comprise at least one rooftop cable penetration through which a cable provides the first timing signal to the first grand master clock, via an optical converter, from at least one GPS antenna that communicatively couples to the first GPS source.

According to some embodiments, the PTP timing signal might be a virtual PTP timing signal, and the at least one BBU might comprise at least one virtual BBU ("vBBU"). The first slave clock might comprise a timing virtual machine ("VM") that is created in each of at least one pod, and the first grand master clock and the at least one pod might be disposed within the at least one of the central office or the BBU hotel associated with the wireless carrier. The first grand master clock might communicatively couple with the at least one pod via optical fiber communication. The at least one of the central office or the BBU hotel might comprise at least one rooftop cable penetration through which a cable provides the first timing signal to the first grand master clock from at least one GPS antenna that communicatively couples to the first GPS source, and the at least one vBBU might receive time information and time synchronization, via the virtual PTP timing signal, directly from the at least one pod.

Merely by way of example, in some embodiments, the system might further comprise a second grand master clock. The second grand master clock might comprise a third processor and a third non-transitory computer readable medium communicatively coupled to the at least one third processor. The third non-transitory computer readable medium might have stored thereon computer software comprising a third set of instructions that, when executed by the at least one third processor, causes the second grand master clock to: receive a fourth timing signal from at least one of the first GPS source or a second GPS source; send a fifth timing signal to a second slave clock via a third network path in the first network, the fifth timing signal being based at least in part on the fourth timing signal, the third network path being different from any of the first network path or the second network path; and send the fifth timing signal to the second slave clock via a fourth network path in the first network, the fourth network path being different from any of the first network path, the second network path, or the third network path. In some cases, the second set of instructions, when executed by the at least one second processor, might further cause the computing system to: calculate a third transmission time for the fifth timing signal to be transmitted between the second grand master clock and the second slave clock via the third network path; calculate a fourth transmission time for the fifth timing signal to be transmitted between the second grand master clock and the second slave clock via the fourth network path; based on a determination that the third transmission time and the fourth transmission time are different, calculate a time delay difference between the third network path and the fourth network path in terms of sending the fifth timing signal to the second slave clock; generate a sixth timing signal, based at least in part on the fifth timing signal and the calculated time delay difference between the third network path and the fourth network path and based at least in part on the second timing signal and the calculated time delay difference between the first network path and the second network path; and send the generated sixth timing signal to the network node disposed within the second network.

In some cases, the first network path might comprise a first sequence of a first plurality of network elements through which the second timing signal is sent. The second network path might comprise a second sequence of the same first plurality of network elements through which the second timing signal is sent, and the second sequence might be the opposite of the first sequence. Similarly, the third network path might comprise a third sequence of a second plurality of network elements through which the fifth timing signal is sent. The fourth network path might comprise a fourth sequence of the same second plurality of network elements through which the fifth timing signal is sent, and the fourth sequence might be the opposite of the third sequence.

In some embodiments, the first network path and the second network path might each comprise open systems interconnection ("OSI") model layer 3 network devices, routers, and switches, and the first grand master clock might be disposed within a service provider central office in the first network. In some instances, the first network path and the second network path might each comprise OSI model layer 2 network devices and switches, and the first grand master clock might be disposed within a service provider central office in the first network. In some cases, the first network path and the second network path might each comprise OSI model 1 network devices, and the first grand master clock might be communicatively coupled with a reconfigurable optical add-drop multiplexer ("ROADM").

According to some embodiments, sending the generated third timing signal to the network node might comprise sending the generated third timing signal to the network node disposed within the second network via optical fiber communication between the computing system and the network node. In some cases, each of the first network path and the second network path might be static network paths.

Various modifications and additions can be made to the embodiments discussed without departing from the scope of the invention. For example, while the embodiments described above refer to particular features, the scope of this invention also includes embodiments having different combination of features and embodiments that do not include all of the above described features.

Specific Exemplary Embodiments

We now turn to the embodiments as illustrated by the drawings. FIGS. 1-8 illustrate some of the features of the method, system, and apparatus for implementing network timing functionality, and, in particular embodiments, to methods, systems, apparatus, and computer software for implementing Accurate Synchronization as a Service ("ASaaS") functionality, as referred to above. The methods, systems, and apparatuses illustrated by FIGS. 1-8 refer to examples of different embodiments that include various components and steps, which can be considered alternatives or which can be used in conjunction with one another in the various embodiments. The description of the illustrated methods, systems, and apparatuses shown in FIGS. 1-8 is provided for purposes of illustration and should not be considered to limit the scope of the different embodiments.

With reference to the figures, FIG. 1 is a schematic diagram illustrating a system 100 for implementing Accurate Synchronization as a Service ("ASaaS") functionality, in accordance with various embodiments. In the non-limiting embodiment of FIG. 1, system 100 might comprise a first grand master clock 105$a$, which might receive a first timing signal 110$a$ from a first global positioning system ("GPS") source 115$a$, via a GPS transmitter or broadcast system 120$a$ communicatively coupled to the GPS source 115$a$ and a GPS antenna 120$b$ communicatively coupled to the first grand master clock 105$a$. The first grand master clock 105$a$ might send a second timing signal 125$a$ and/or 140$a$—in some cases, via a computing system 130 in service provider network(s) 135—to a first slave clock 145$a$ in network(s) 150, which might be associated with a customer (which might be a wireless service provider, a cellular communications service provider, an end-user, and/or the like). In some cases, the network(s) 150 might include, without limitation, at least one of a 5G network(s), a centralized radio access network(s) ("C-RAN(s)"), a cellular network, a WiFi network, other wireless communications networks, and/or the like. The second timing signal might, in some instances, be based at least in part on the first timing signal. In some cases, at least one of the first timing signal or the second timing signal might each comprise a precision time protocol ("PTP") timing signal, which might include, but is not limited to, frequency information, phase information, time of day information, and/or the like.

In some embodiments, the first grand master clock 105$a$ might send the second timing signal to the first slave clock 145$a$ via a first network path in the first network and might send the second timing signal to the first slave clock 145$a$ via a second network path in the first network, the second network path being different from the first network path. According to some embodiments, the first network path might comprise a first sequence of a first plurality of network elements through which the second timing signal is sent, while the second network path might comprise a second sequence of the same first plurality of network elements through which the second timing signal is sent, and the second sequence might be the opposite of the first sequence. In other words, in such embodiments, sending the timing signal along the first network path might comprise sending from the master clock to the slave clock, while sending the timing signal along the second network path might comprise sending along a return path from the slave clock to the master clock, or vice versa, where the timing signal passes along the same network elements except in the reverse order along the return path.

According to some embodiments, the first network path and the second network path might each comprise open systems interconnection ("OSI") model layer 1 network devices, and the first grand master clock might be communicatively coupled with a reconfigurable optical add-drop multiplexer ("ROADM"), which might utilize at least one of dense wavelength division multiplexing ("DWDM") and/or coarse wavelength division multiplexing ("CWDM") techniques, or the like. Alternatively, or additionally, the first network path and the second network path might each comprise OSI model layer 2 network devices and switches, and the first grand master clock might be disposed within a service provider central office in the first network. Alternatively, or additionally, the first network path and the second network path might each comprise OSI model layer 3 network devices, routers, and switches, and the first grand master clock might also be disposed within a service provider central office in the first network. In some cases, each of the first network path and the second network path might be static network paths. With the physical paths and routes being the same (or static), the highest quality of services to transport timing information can be achieved, while ensuring the smallest levels of variations in the delay—along either direction.

In some instances, the computing system 130 might calculate a first transmission time for the second timing signal to be transmitted between the first grand master clock 105a and the first slave clock 145a via the first network path, and might calculate a second transmission time for the second timing signal to be transmitted between the first grand master clock 105a and the first slave clock 145a via the second network path. Based on a determination that the first transmission time and the second transmission time are different, the computing system 130 might calculate a time delay difference between the first network path and the second network path in terms of sending the second timing signal to the first slave clock 145a. The computing system 130 might then generate a third timing signal 155a, based at least in part on the second timing signal and the calculated time delay difference between the first network path and the second network path, and might send the generated third timing signal 155a to a network node 160 disposed within the second network 150 (in some cases, via the first slave clock 145a). The network node 160, in some cases, might include, without limitation, at least one of one or more network elements, one or more base band units ("BBUs"), one or more computing systems, and/or the like. The one or more network elements might include, but are not limited to, network switches, network nodes, network routers, gateway devices, and/or the like. The one or more BBUs might comprise cellular BBUs, wireless communications BBUs, and/or the like. In some cases, at least one of the one or more BBUs might include one or more virtual BBUs ("vBBUs"), or the like. The network node 160 might, in turn, provide timing signal 165a (which might either be the same as timing signal 155a or might be based at least in part on timing signal 155a) to one or more devices 170a-170n (collectively, "devices 170"), which might include, but are not limited to, one or more BBUs, one or more remote radio heads ("RRHs"), one or more other network elements, one or more other fronthaul or front haul network elements, one or more backhaul or back haul network elements, or any other devices that utilize timing signals, and/or the like.

According to some embodiments, system 100 might further comprise a second grand master clock 105b, which might receive a fourth timing signal 110b from a second GPS source 115b, via a GPS transmitter or broadcast system 120a communicatively coupled to the GPS source 115b and a GPS antenna 120b communicatively coupled to the second grand master clock 105b. The second grand master clock 105b might send a fifth timing signal 125b and/or 140b—in some cases, via the computing system 130 in service provider network(s) 135—to a second slave clock 145b in network(s) 150. The fifth timing signal might, in some instances, be based at least in part on the fourth timing signal. In some cases, at least one of the fourth timing signal or the fifth timing signal might each comprise a PTP timing signal, which, as described above, might include, but is not limited to, frequency information, phase information, time of day information, and/or the like.

In some embodiments, the second grand master clock 105b might send the fifth timing signal to the second slave clock 145b via a third network path in the first network and might send the fifth timing signal to the second slave clock 145b via a fourth network path in the first network, the fourth network path being different from the third network path (and also difference from either the first network path or the second network path). According to some embodiments, the third network path might comprise a third sequence of a second plurality of network elements through which the fifth timing signal is sent, while the fourth network path might comprise a fourth sequence of the same second plurality of network elements through which the fifth timing signal is sent, and the fourth sequence might be the opposite of the third sequence. In other words, in such embodiments, sending the timing signal along the third network path might comprise sending from the master clock to the slave clock, while sending the timing signal along the fourth network path might comprise sending along a return path from the slave clock to the master clock, or vice versa, where the timing signal passes along the same network elements except in the reverse order along the return path.

In some instances, the computing system 130 might calculate a third transmission time for the fifth timing signal to be transmitted between the second grand master clock 105b and the second slave clock 145b via the third network path, and might calculate a fourth transmission time for the fifth timing signal to be transmitted between the second grand master clock 105b and the second slave clock 145b via the fourth network path. Based on a determination that the third transmission time and the fourth transmission time are different, the computing system 130 might calculate a time delay difference between the third network path and the fourth network path in terms of sending the fifth timing signal to the second slave clock 145b. The computing system 130 might then generate a sixth timing signal 155b, based at least in part on the second timing signal and the calculated time delay difference between the first network path and the second network path and based at least in part on the fifth timing signal and the calculated time delay difference between the third network path and the fourth network path, and might send the generated sixth timing signal 155b to a network node 160 disposed within the second network 150 (in some cases, via the second slave clock 145b). The network node 160 might, in turn, provide timing signal 165b (which might either be the same as timing signal 155b or might be based at least in part on timing signal 155b) to the one or more devices 170a-170n. The use of two master clocks and two slave clocks, in some embodiments, provide redundancy. In some embodiments, the two paths master clocks-to-slave clocks remain independent and fixed in time.

According to some embodiments, the first/second grand master clock(s) 105 and/or the computing system 130 might send the second timing signal or fifth timing signal via one or more network elements 175a-175n (collectively, "network elements 175"), which might include, without limitation, at least one of network switches, network nodes, network routers, gateway devices, and/or the like. As shown in the non-limiting embodiment of FIG. 1, rather than sending timing signals 140a and 140b directly (or substantially directly) to the first and second slave clocks 145a and 145b, timing signals 140 might be sent via the one or more network elements 175, with the second timing signal (shown as timing signal 140c) being sent between the network element 175n and the first slave clock 145a and the fifth timing signal (shown as timing signal 140d) being sent between the network element 175n and the second slave clock 145b.

Figure 2:
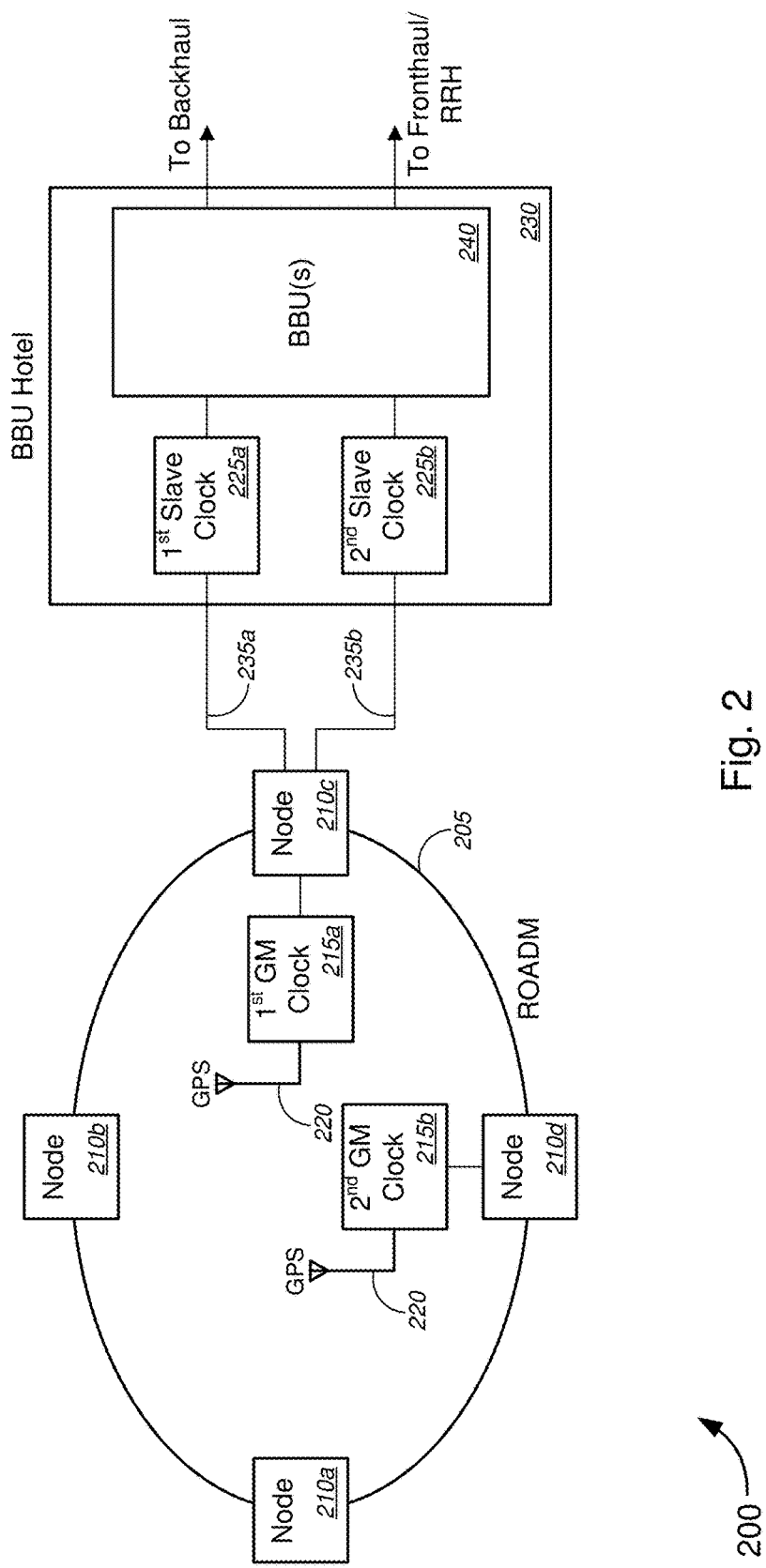
FIG. 2 is a schematic diagram illustrating a system for implementing ASaaS functionality using open systems interconnection ("OSI") model layer 1 network elements, in accordance with various embodiments.

FIG. 2 is a schematic diagram illustrating a system 200 for implementing ASaaS functionality using open systems interconnection ("OSI") model layer 1 network elements, in accordance with various embodiments. In the embodiment of FIG. 200, system 200 might comprise a reconfigurable optical add-drop multiplexer ("ROADM") 205, which might be part of an optical mesh network or the like (not shown). System 200 might further comprise one or more nodes 210a-210d (collectively, "nodes 210") that, in some cases, might serve as input and/or output for the ROADM 205. In some cases, the one or more nodes 210 might include, without limitation, at least one of one or more network switches, one or more network nodes, one or more network routers, one or more gateway devices, and/or the like. Here, the ROADM 205 and the one or more nodes 210 might be OSI layer 1 network elements.

System 200 might also comprise a first grand master clock 215a and a second grand master clock 215b, each of which might be communicatively coupled to a GPS antenna 220 that receives timing signals from a GPS source (such as GPS source(s) 115 of FIG. 1, or the like). System 200 might further comprise a first slave clock 225a and a second slave clock 225b that may both be disposed in a base band unit ("BBU") hotel 230, or the like. The first grand master clock 215a might send, via node 210c (for example), a first timing signal to the first slave clock 225a via network path 235a, while the second grand master clock 215b might send, via nodes 210d and 210c (for example), a second timing signal to the second slave clock 225b via network path 235b. According to some embodiments, one of the first grand master clock 215a, the second grand master clock 215b, the node 210c, and/or the like (collectively, "the computing system") might calculate at least one of a first transmission time from the first grand master clock 215a to the first slave clock 225a, a second transmission time from the first slave clock 225a back to the first grand master clock 215a, a third transmission time from the second grand master clock 215b to the second slave clock 225b, a fourth transmission time from the second slave clock 225b back to the second grand master clock 215b, and/or the like. Based on a determination that the first transmission time is different from the second transmission time, the computing system might calculate a first time delay difference between the second transmission time and the first transmission time. Similarly, based on a determination that the third transmission time is different from the fourth transmission time, the computing system might calculate a second time delay difference between the fourth transmission time and the third transmission time. Based on a determination that the first transmission time is different from the third transmission time, the computing system might calculate a third time delay difference between the third transmission time and the first transmission time. Likewise, based on a determination that the second transmission time is different from the fourth transmission time, the computing system might calculate a fourth time delay difference between the fourth transmission time and the second transmission time. Based at least in part on one or more of the first time delay difference, the second time delay difference, the third time delay difference, and the fourth time delay difference, and based at least in part on at least one of the first timing signal, the second timing signal, the first transmission time, the second transmission time, the third transmission time, and/or the fourth transmission time, the computing system might generate a third timing signal and might send the generated third timing signal to the first and second slave clocks 225, which might forward the third timing signal to one or more BBUs 240 that are housed in the BBU hotel 230. The one or more BBUs 240 might forward the timing signal to one or more remote radio heads ("RRHs"), one or more other network elements, one or more other fronthaul or front-haul network elements, one or more backhaul or back-haul network elements, or any other devices that utilize timing signals, and/or the like. In some embodiments, at least one of the first timing signal, the second timing signal, the generated third timing signal, the forwarded timing signals, and/or the like might each comprise a precision time protocol ("PTP") timing signal, which might include, but is not limited to, frequency information, phase information, time of day information, and/or the like.

The delivery of timing signals using the configuration of system 200 or using layer 1 network elements enables transmission of timing signals over great distances while maintaining a very high quality timing signal (e.g., PTP signal).

The first grand master clock 215a, the second grand master clock 215b, the GPS antenna 220, the one or more nodes 210, the first slave clock 225a, the second slave clock 225b, and the BBUs 240 of system 200 might otherwise be similar, if not identical, to the first grand master clock 105a, the second grand master clock 105b, the GPS antenna 120b, the computing system 130 or the one or more network elements 175, the first slave clock 145a, the second slave clock 145b, and the network node 160 of system 100 of FIG. 1, respectively, and the descriptions of these components of system 100 are applicable to the corresponding components of system 200, respectively.

Figure 3:
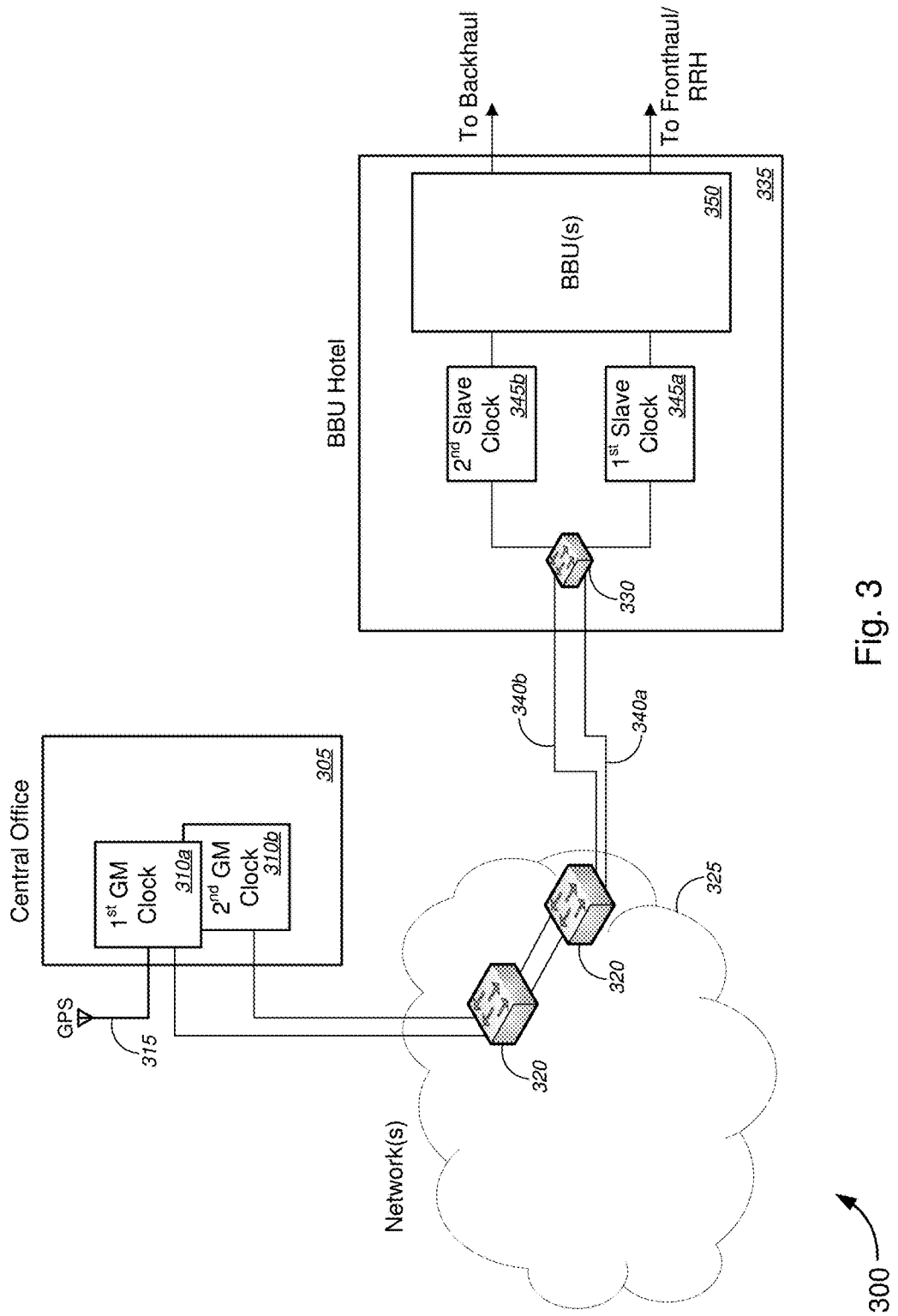
FIG. 3 is a schematic diagram illustrating a system for implementing ASaaS functionality using OSI model layer 2 network elements, in accordance with various embodiments.

FIG. 3 is a schematic diagram illustrating a system 300 for implementing ASaaS functionality using OSI model layer 2 network elements, in accordance with various embodiments. In the embodiment of FIG. 300, system 300 might comprise a service provider central office ("CO") 305, which might be part of a service provider network 325 or the like. System 300 might further comprise a first grand master clock 310a and a second grand master clock 310b, each of which might be communicatively coupled to a GPS antenna 315 (in some cases, to the same GPS antenna 315) that receives timing signals from a GPS source (such as GPS source(s) 115 of FIG. 1, or the like). The first grand master clock 310a and the second grand master clock 310b might be located within the CO 305.

System 300 might also comprise one or more network elements 320 disposed within network(s) 325 and one or more nodes 330 disposed within a BBU hotel 335. Although the one or more network elements 320 and the one or more nodes 330 are depicted in FIG. 3 by switch icons, the one or more network elements 320 and the one or more nodes 330 might each include, without limitation, one or more network switches, one or more network nodes, one or more network routers, one or more gateway devices, and/or the like. Here, the one or more network elements 320 and the one or more nodes 330 might be OSI layer 2 network elements.

System 300 might further comprise a first slave clock 345a and a second slave clock 345b that may both be disposed in the BBU hotel 335, or the like. The first grand master clock 305a might send, via the one or more network elements 320 and the one or more nodes 330 (for example), a first timing signal to the first slave clock 345a via network path 340a, while the second grand master clock 305b might send, via the one or more network elements 320 and the one or more nodes 330 (for example), a second timing signal to the second slave clock 345b via network path 340b. According to some embodiments, one of the first grand master clock 315a, the second grand master clock 315b, the one or more network elements 320, and the one or more nodes 330, and/or the like (collectively, "the computing system") might calculate at least one of a first transmission time from the first grand master clock 305a to the first slave clock 345a, a second transmission time from the first slave clock 345a back to the first grand master clock 305a, a third transmission time from the second grand master clock 305b to the second slave clock 345b, a fourth transmission time from the second slave clock 345b back to the second grand master clock 305b, and/or the like. Based on a determination that the first transmission time is different from the second transmission time, the computing system might calculate a first time delay difference between the second transmission time and the first transmission time. Similarly, based on a determination that the third transmission time is different from the fourth transmission time, the computing system might calculate a second time delay difference between the fourth transmission time and the third transmission time. Based on a determination that the first transmission time is different from the third transmission time, the computing system might calculate a third time delay difference between the third transmission time and the first transmission time. Likewise, based on a determination that the second transmission time is different from the fourth transmission time, the computing system might calculate a fourth time delay difference between the fourth transmission time and the second transmission time. Based at least in part on one or more of the first time delay difference, the second time delay difference, the third time delay difference, and the fourth time delay difference, and based at least in part on at least one of the first timing signal, the second timing signal, the first transmission time, the second transmission time, the third transmission time, and/or the fourth transmission time, the computing system might generate a third timing signal and might send the generated third timing signal to the first and second slave clocks 345, which might forward the third timing signal to one or more BBUs 350 that are housed in the BBU hotel 335. The one or more BBUs 350 might forward the timing signal to one or more remote radio heads ("RRHs"), one or more other network elements, one or more other fronthaul network elements, one or more backhaul network elements, or any other devices that utilize timing signals, and/or the like. In some embodiments, at least one of the first timing signal, the second timing signal, the generated third timing signal, the forwarded timing signals, and/or the like might each comprise a PTP timing signal, which might include, but is not limited to, frequency information, phase information, time of day information, and/or the like.

This set of embodiments use layer 2 network devices, switches, and/or the like to deliver PTP (or other) timing signals to a network(s) (e.g., a wireless carrier's network(s) or the like). In some cases, only layer 2 devices near the edge of the network/cloud might be used. In other words, such embodiments might only be implemented in localized geographical areas. Quality of service ("QoS") might be enabled, in some instances, and a guaranteed static route might be established. Like the embodiment of FIG. 2, deploying network equipment after the slave clocks may allow the distribution of the PTP signal to support multiple BBUs in the CO or BBU hotel 335.

The first grand master clock 305a, the second grand master clock 305b, the GPS antenna 315, the one or more network elements 320 or the one or more nodes 330, the first slave clock 345a, the second slave clock 345b, and the BBUs 350 of system 300 might otherwise be similar, if not identical, to the first grand master clock 105a, the second grand master clock 105b, the GPS antenna 120b, the computing system 130 or the one or more network elements 175, the first slave clock 145a, the second slave clock 145b, and the network node 160 of system 100 of FIG. 1, respectively, and the descriptions of these components of system 100 are applicable to the corresponding components of system 300, respectively.

Figure 4:
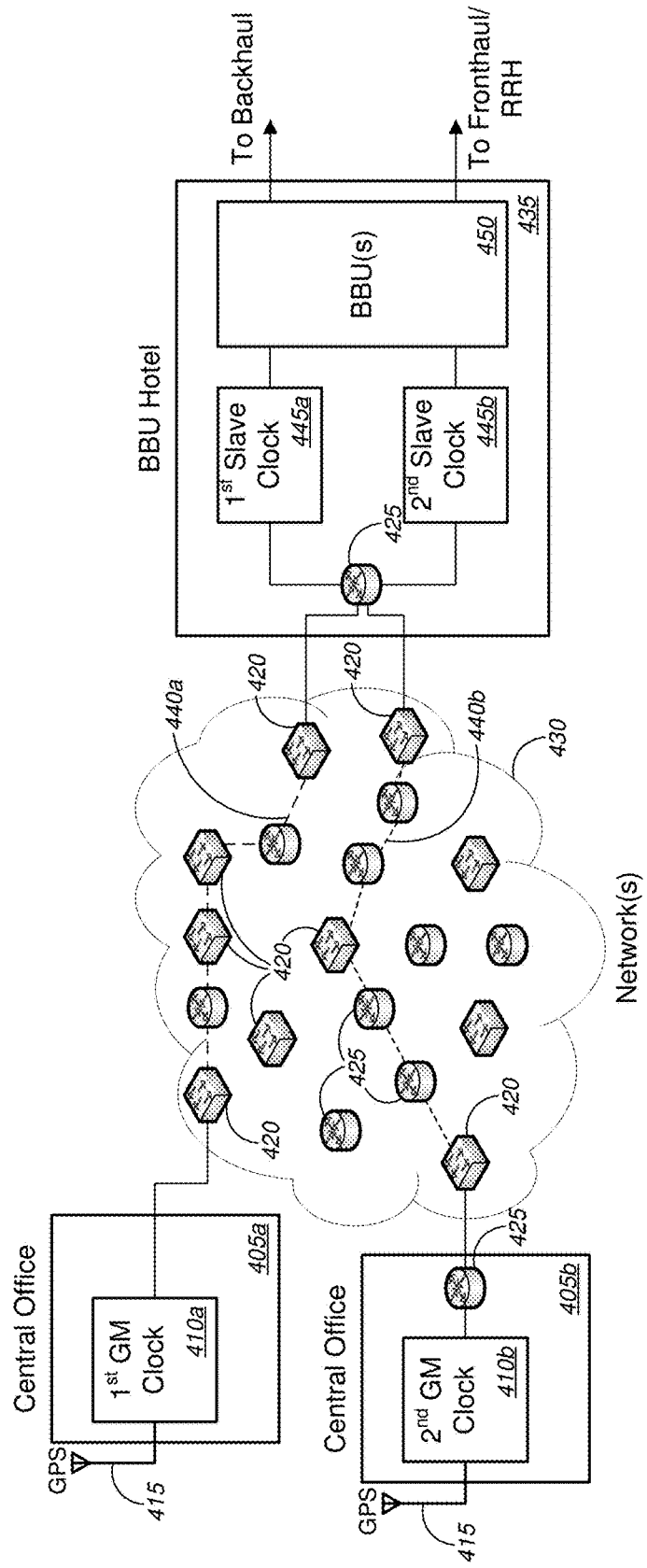
FIG. 4 is a schematic diagram illustrating a system for implementing ASaaS functionality using OSI model layer 3 network elements, in accordance with various embodiments.

FIG. 4 is a schematic diagram illustrating a system 400 for implementing ASaaS functionality using OSI model layer 3 network elements, in accordance with various embodiments. In the embodiment of FIG. 400, system 400 might comprise one or more service provider central office ("CO") 405a and 405b (collectively, "COs 405" or "central offices 405," or the like), which might be part of a service provider network 430 or the like. System 400 might further comprise a first grand master clock 410a located at CO 405a and a second grand master clock 410b located at CO 405b, each of the master clocks 410 might be communicatively coupled to a respective GPS antenna 415 that receives timing signals from one or more GPS sources (such as GPS sources 115 of FIG. 1, or the like).

System 400 might also comprise one or more network elements 420 and 425 disposed within network(s) 430 (and, in some cases, also disposed at one or more of the CO 405 and/or at a BBU hotel 435). Although the one or more network elements 420 are depicted in FIG. 4 by switch icons and the one or more network elements 425 are depicted in FIG. 4 by router icons, the one or more network elements 420 and 425 might each include, without limitation, one or more network switches, one or more network nodes, one or more network routers, one or more gateway devices, and/or the like. Here, the one or more network elements 420 and 425 might be OSI layer 3 network elements.

System 400 might further comprise a first slave clock 445a and a second slave clock 445b that may both be disposed in the BBU hotel 435, or the like. The first grand master clock 405a might send, via the one or more network elements 420 and 425 (for example), a first timing signal to the first slave clock 445a via network path 440a, while the second grand master clock 405b might send, via the one or more network elements 420 and 425 (for example), a second timing signal to the second slave clock 445b via network path 440b. Although network path 440a is depicted in FIG. 4 as consisting of a first network switch 420, a first router 425, a second network switch 420, a third network switch 420, a second router 425, a fourth network switch 420, and a BBU hotel router 425, in order from the first grand master clock 405a to the first slave clock 445a, the various embodiments are not so limited, and network path 440a between the first grand master clock 405a to the first slave clock 445a can have any number of network switches, network nodes, routers, gateways, and/or the like in any particular sequence, as appropriate or as desired. Likewise, although network path 440b is depicted in FIG. 4 as consisting of a CO router 425, first network switch 420, a first router 425, a second router 425, a second network switch 420, a third router 425, a fourth router 425, a third network switch 420, and a BBU hotel router 425, in order from the second grand master clock 405b to the second slave clock 445b, the various embodiments are not so limited, and network path 440a between the second grand master clock 405b to the second slave clock 445b can have any number of network switches, network nodes, routers, gateways, and/or the like in any particular sequence, as appropriate or as desired.

According to some embodiments, one of the first grand master clock 415a, the second grand master clock 415b, the one or more network elements 420 or 425, and/or the like (collectively, "the computing system") might calculate at least one of a first transmission time from the first grand master clock 405a to the first slave clock 445a, a second transmission time from the first slave clock 445a back to the first grand master clock 405a, a third transmission time from the second grand master clock 405b to the second slave clock 445b, a fourth transmission time from the second slave clock 445b back to the second grand master clock 405b, and/or the like. Based on a determination that the first transmission time is different from the second transmission time, the computing system might calculate a first time delay difference between the second transmission time and the first transmission time. Similarly, based on a determination that the third transmission time is different from the fourth transmission time, the computing system might calculate a second time delay difference between the fourth transmission time and the third transmission time. Based on a determination that the first transmission time is different from the third transmission time, the computing system might calculate a third time delay difference between the third transmission time and the first transmission time. Likewise, based on a determination that the second transmission time is different from the fourth transmission time, the computing system might calculate a fourth time delay difference between the fourth transmission time and the second transmission time. Based at least in part on one or more of the first time delay difference, the second time delay difference, the third time delay difference, and the fourth time delay difference, and based at least in part on at least one of the first timing signal, the second timing signal, the first transmission time, the second transmission time, the third transmission time, and/or the fourth transmission time, the computing system might generate a third timing signal and might send the generated third timing signal to the first and second slave clocks 445, which might forward the third timing signal to one or more BBUs 450 that are housed in the BBU hotel 435. The one or more BBUs 450 might forward the timing signal to one or more remote radio heads ("RRHs"), one or more other network elements, one or more other fronthaul network elements, one or more backhaul network elements, or any other devices that utilize timing signals, and/or the like. In some embodiments, at least one of the first timing signal, the second timing signal, the generated third timing signal, the forwarded timing signals, and/or the like might each comprise a PTP timing signal, which might include, but is not limited to, frequency information, phase information, time of day information, and/or the like.

This set of embodiments use layer 3 network devices, switches, routers, and/or the like to deliver PTP (or other) timing signals to a network(s) (e.g., a wireless carrier's network(s) or the like). These embodiments accommodate the need for the PTP timing signal (or other timing signal) to be delivered to locations across metropolitan areas by using the layer 3 network equipment. Quality of service ("QoS") might be enabled, in some instances, and a guaranteed static route might be established. Like the embodiments of FIGS. 2 and 3, deploying network equipment after the slave clocks may allow the distribution of the PTP signal to support multiple BBUs in the CO or BBU hotel 335. In some embodiments, PTP boundary clocks could also be deployed at the edge of the cloud or network to enhance the PTP signal quality at the slave clocks. Deploying transparent clock technology in the cloud or network devices might also enhance the PTP signal quality at the slave clocks. Advantageously, the layer 3 networks are more sophisticated and are in general more secure than layer 2 networks. Routing can be managed without some of the inherent problems encountered by the layer 2 networks.

For both layer 2 and layer 3 networks, the various transport systems described herein, in some cases, might be used to deliver accurate timing, which, in some cases, might utilize open-loop feedback information or closed-loop feedback information, thereby compensating for variations in the network path. In some instances, accurate timing sources (e.g., GPS sources in or outside the network) might be used. One or more grand master clocks might each transmit timing information a slave clock(s), which might be co-located (e.g., in a base band unit ("BBU") hotel, a wireless service provider network, or the like). Time delay difference between paths might be calculated (e.g., node A to node Z and node Z to node A, or the like). An open-loop system (or a closed-loop system) might be in place to perform the measurement at a given frequency (which might be adjustable by software). The difference is taken into account for accurate timing. PTP might actively transmit time of day information, frequency information, and phase information. Due to the variability in the networks, the differences are generally larger for the layer 2 and layer 3 networks compared to the layer 1 networks. In some cases, the system might (establish and) enforce a path as static (i.e., unchanging, etc.) and as high priority as the networks allow. In some instances, the system might guarantee that physical paths and routes remain the same. The system might also guarantee the highest quality service to transport timing information. This ensures smallest levels of variations in the delay—in either direction. There might usually be two master clocks and two slave clocks for redundancy (although one of each might be used where appropriate). In some embodiments, the two paths master clocks-to-slave clocks remain independent and fixed in time.

The first grand master clock 405a, the second grand master clock 405b, the GPS antenna 415, the one or more network elements 420 or 425, the first slave clock 445a, the second slave clock 445b, and the BBUs 450 of system 400 might otherwise be similar, if not identical, to the first grand master clock 105a, the second grand master clock 105b, the GPS antenna 120b, the computing system 130 or the one or more network elements 175, the first slave clock 145a, the second slave clock 145b, and the network node 160 of system 100 of FIG. 1, respectively, and the descriptions of these components of system 100 are applicable to the corresponding components of system 400, respectively.

Figure 5:
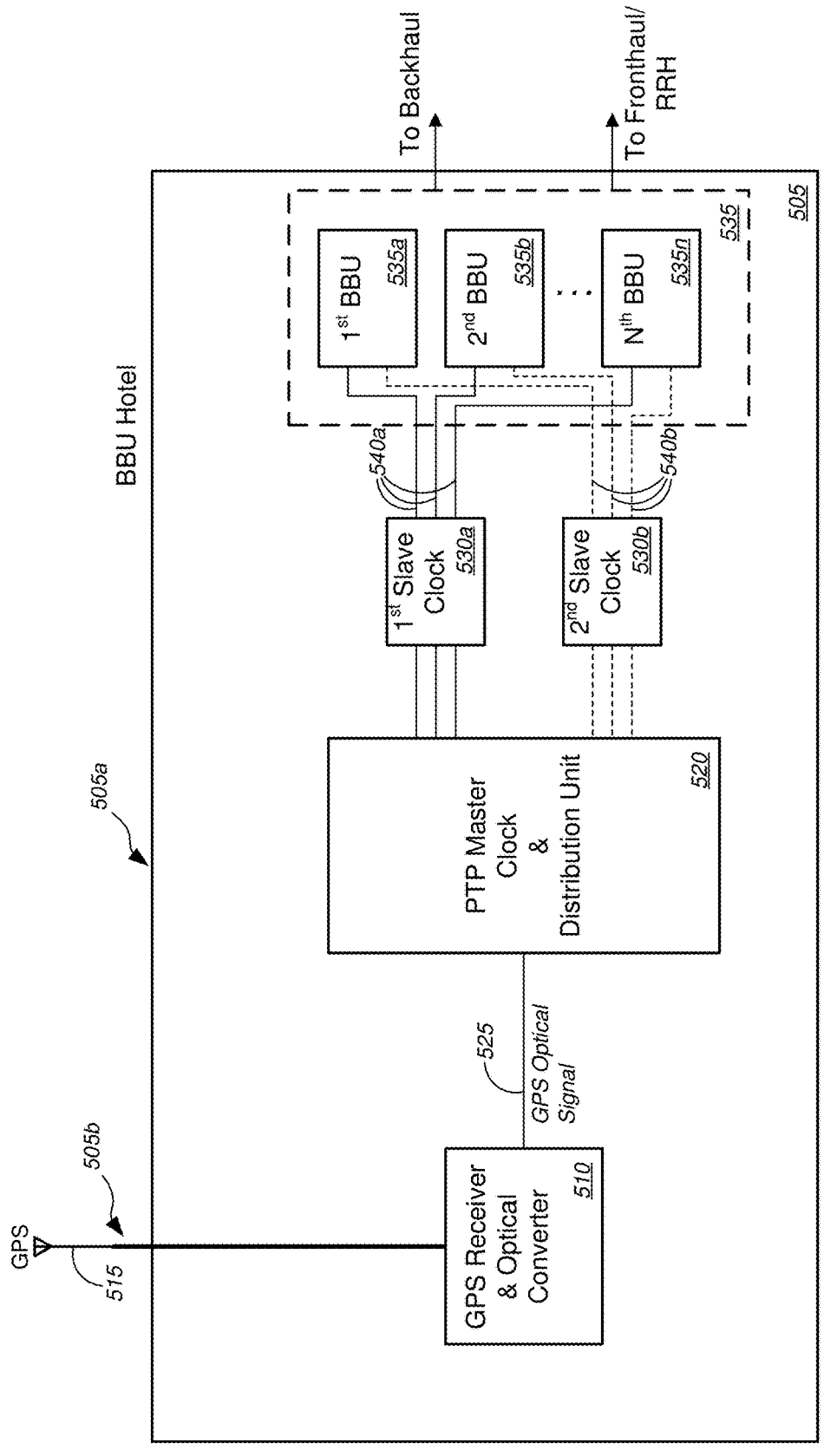
FIG. 5 is a schematic diagram illustrating another system for implementing ASaaS functionality, in accordance with various embodiments.

FIG. 5 is a schematic diagram illustrating another system 500 for implementing ASaaS functionality, in accordance with various embodiments. In the embodiment of FIG. 5, system 500 might comprise a BBU hotel or wireless communications service provider central office 505, which might comprise a (physical) roof 505a and a rooftop cable penetration 505b. System 500 might further comprise a GPS receiver and optical converter 510, which is located within the BBU hotel 505, that might be communicatively coupled to a GPS antenna 515 that receives timing signals from one or more GPS sources (such as GPS sources 115 of FIG. 1, or the like). The GPS receiver and optical converter 510 might receive the timing signals from the GPS antenna 515 via a wire penetrating through the rooftop cable penetration 505b.

System 500 might further comprise a PTP master clock and distribution unit/device 520 also located within the BBU hotel 505. The PTP master clock 520 receives a GPS optical signal from the optical converter 510 via an optical fiber line between the optical converter 510 and the PTP master clock 520. In some embodiments, the PTP master clock and distribution unit 520 might send a PTP timing signal to each of a first PTP slave clock 530a and a second PTP slave clock 530b, both of which are also located within the BBU hotel 505. System 500 might further comprise one or more BBUs 535 located within the BBU hotel 505. The one or more BBUs 535 might comprise a first BBU 535a, a second BBU 535b, through an $N^{th}$ BBU 535n, each of which might comprise a first input (also referred to as "input A") and a second input (also referred to as "input B"). The first PTP slave clock 530a might send the PTP timing signal to the first input (or input A) of each of the first through $N^{th}$ BBUs 535a-535n via path 540a (shown in FIG. 5 as a solid line between the PTP master clock and each of the BBUs 535), while the second PTP slave clock 530b might send the PTP timing signal to the second input (or input B) of each of the first through $N^{th}$ BBUs 535a-535n via path 540b (shown in FIG. 5 as a dashed line between the PTP master clock and each of the BBUs 535). Each of the BBUs 535 might subsequently forward the PTP timing signal to one or more remote radio heads ("RRHs"), one or more other network elements, one or more other fronthaul network elements, one or more backhaul network elements, or any other devices that utilize timing signals, and/or the like. In some embodiments, the PTP timing signal might include, but is not limited to, frequency information, phase information, time of day information, and/or the like.

The use of a single GPS antenna input that is converted to an optical signal, as shown in the embodiment of FIG. 5 eliminates extra penetration holes in the CO or BBU hotel 505, and lowers the cost of installation (as no mounting of BBU antennas on the roof the structure is required, while cable routing is simplified). The embodiment of FIG. 5 also features distribution of the timing signal(s) using low-latency optical network (after the GPS signal is converted into an optical signal), use of a single GPS antenna, use of PTP over Ethernet point to point link between antenna master and multiple destinations for every BBU requiring a timing signal.

The PTP master clock 520, the GPS antenna 515, the first slave clock 530a, the second slave clock 530b, and the BBUs 535 of system 500 might otherwise be similar, if not identical, to the first or second grand master clock 105a or 105b, the GPS antenna 120b, the first slave clock 145a, the second slave clock 145b, and the network node 160 of system 100 of FIG. 1, respectively, and the descriptions of these components of system 100 are applicable to the corresponding components of system 500, respectively.

Figure 6A:
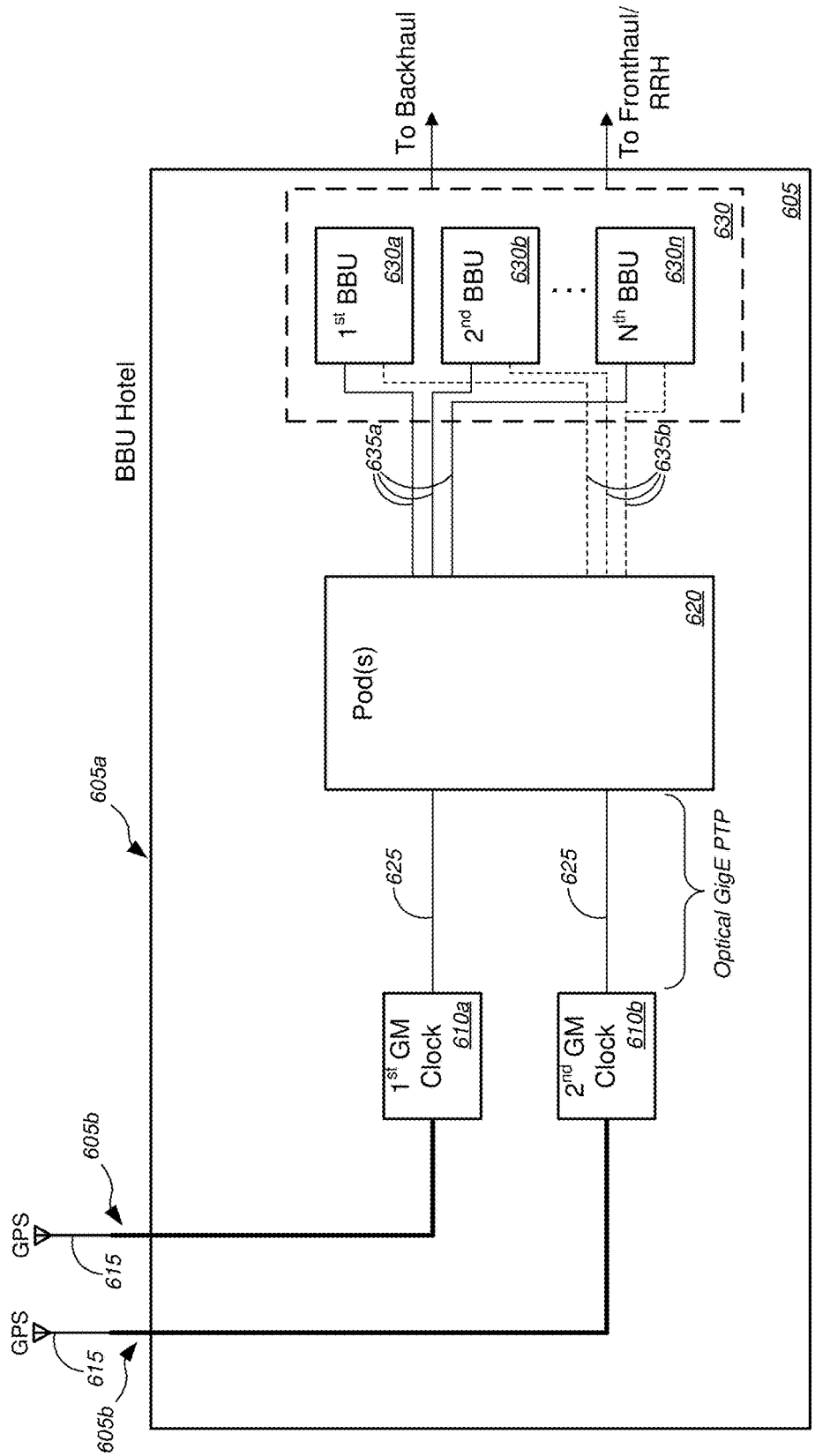
FIGS. 6A and 6B are schematic diagrams illustrating various systems for implementing ASaaS functionality, in accordance with various embodiments.
Figure 6B:
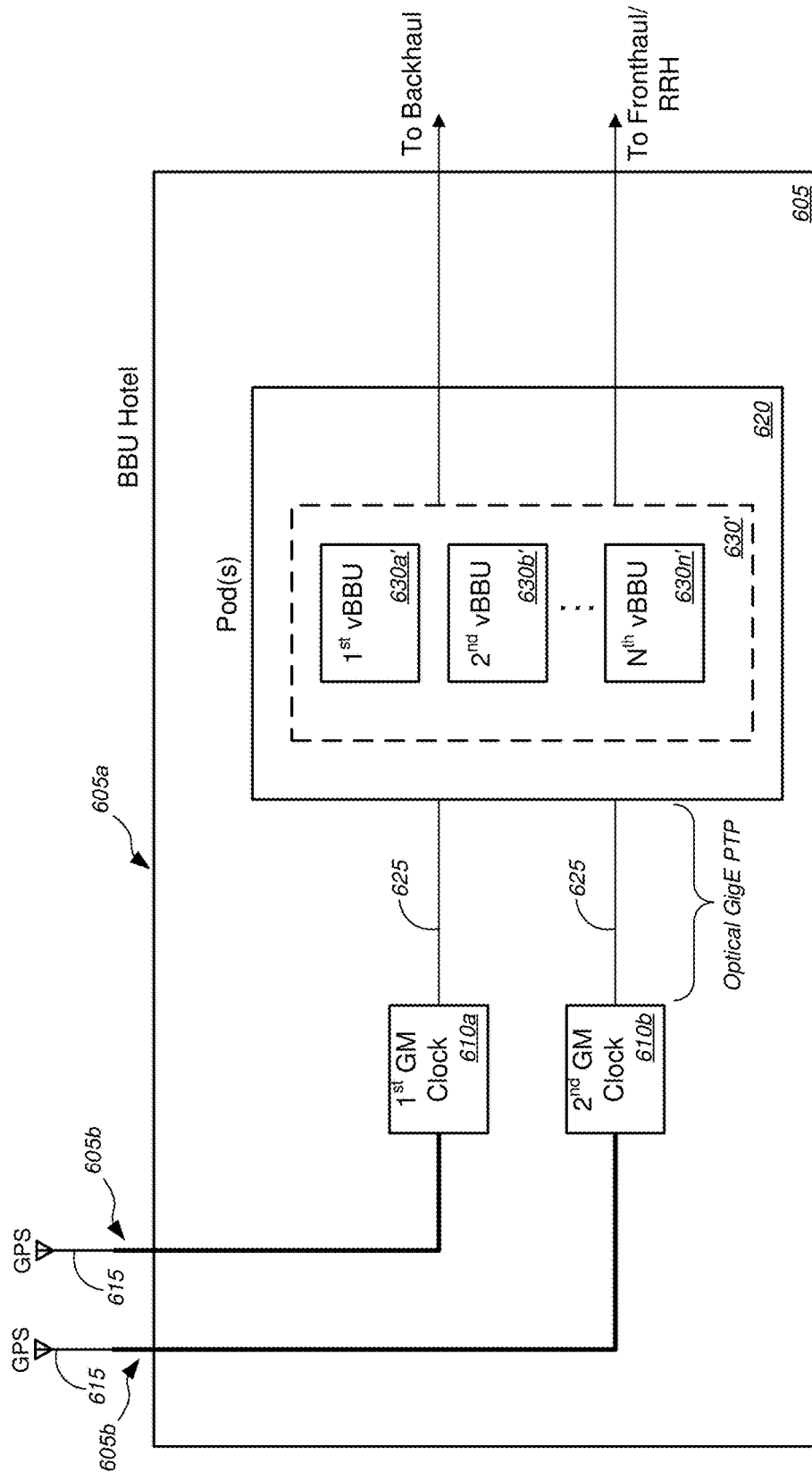

FIGS. 6A and 6B (collectively, "FIG. 6") are schematic diagrams illustrating various systems 600 and 600' for implementing ASaaS functionality, in accordance with various embodiments. FIG. 6A depicts an embodiment in which the BBUs 630 are separate from the one or more pods 620, while FIG. 6B depicts an embodiment in which virtual BBUs 630' are instantiated with the one or more pods 620.

With reference to FIG. 6A, system 600 might comprise a BBU hotel or wireless communications service provider central office 605, which might comprise a (physical) roof 605a and one or more rooftop cable penetrations 605b (two are shown in the embodiment of FIG. 6). System 600 might further comprise a first grand master clock 610a and a second grand master clock 610b, each located within the BBU hotel 605. The first grand master clock 610a might communicatively couple to a first GPS antenna 615 that receives timing signals from one or more GPS sources (such as GPS sources 115 of FIG. 1, or the like), via a wire penetrating through one of the rooftop cable penetration 605b. Similarly, the second grand master clock 610b might communicatively couple to a second GPS antenna 615 that also receives timing signals from one or more (same or different) GPS sources (such as GPS sources 115 of FIG. 1, or the like), via another wire penetrating through another rooftop cable penetration 605b.

System 600 might further comprise one or more pods 620 also located within the BBU hotel 605. The one or more pods 620 might receive a PTP optical timing signal from each of the first grand master clock 610a and the second grand master clock 610b via an optical fiber line 625 (in some cases via a gigabit Ethernet line) between the one or more pods 620 and each of the first grand master clock 610a and the second grand master clock 610b. System 600 might further comprise one or more BBUs 630 located within the BBU hotel 605. The one or more BBUs 630 might comprise a first BBU 630a, a second BBU 630b, through an $N^{th}$ BBU 630n, each of which might comprise a first input (also referred to as "input A") and a second input (also referred to as "input B"). The one or more pods 620 might send the PTP timing signal to the first input (or input A) of each of the first through $N^{th}$ BBUs 630a-630n via path 635a (shown in FIG. 6 as a solid line between the one or more pods 620 and each of the BBUs 630), while sending the PTP timing signal to the second input (or input B) of each of the first through $N^{th}$ BBUs 630a-630n via path 635b (shown in FIG. 6 as a dashed line between the one or more pods 620 and each of the BBUs 630). Each of the BBUs 630 might subsequently forward the PTP timing signal to one or more remote radio heads ("RRHs"), one or more other network elements, one or more other fronthaul network elements, one or more backhaul network elements, or any other devices that utilize timing signals, and/or the like. In some embodiments, the PTP timing signal might include, but is not limited to, frequency information, phase information, time of day information, and/or the like.

In some embodiments, the one or more pods 620 might comprise one or more pseudo-pods. Herein, "pseudo-pod" might refer to hardware resources that might be the customer device version of hardware resources that may be found in a service provider network functions virtualization infrastructure ("NFVI") (which are referred to herein as pods, and might be embodied in the service provider NFVI as one or more racks of equipment or the like). In some embodiments, each pod might represent and/or include physical hardware resources that are part of the NFVI system, or the like. In some cases, each pod might represent a rack of network communications equipment (e.g., compute resource, storage resource, etc.) within a telecommunications facility (in this case, a CO or BBU hotel that is associated with a wireless communications or cellular service provider or the like. According to some embodiments, the one or more pods 620 might allow the wireless communications or cellular service provider or the like to internally burst at least one PTP timing signal among its own physical or virtual hardware resources. In some cases, specific timing virtual machines ("VMs") might be created in every pod 620 (at least 2 for redundancy) that might serve as virtual slave clocks. The grand master clocks 610 deliver accurate timing to every pod 620 via direct optical Ethernet path or the like, and each timing VM provides timing signals to the one or more BBUs 630, which in turn forward the timing signals to the backhaul and/or to the fronthaul (including RRHs or the like).

Turning to FIG. 6B, the BBU hotel 605 (including the roof 605a and the one or more rooftop cable penetrations 605b, etc.), the first grand master clock 610a, the second grand master clock 610b, the GPS antennas 615, the one or more pods 620, and the optical fiber line 625 of system 600' might be similar, if not identical, to the BBU hotel 605 (including the roof 605a and the one or more rooftop cable penetrations 605b, etc.), the first grand master clock 610a, the second grand master clock 610b, the GPS antennas 615, the one or more pods 620, and the optical fiber line 625 of system 600 in FIG. 6A, except that the one or more pods 620 might comprise one or more virtual BBUs ("vBBUs") 630', which might comprise a first vBBU 630a', a second vBBU 630b', through an $N^{th}$ vBBU 630n', rather than one or more (physical) BBUs being separate from (yet communicatively coupled with) the one or more pods 620.

Similar to the embodiment of FIG. 6A, the one or more pods 620 might comprise one or more pseudo-pods. As above, "pseudo-pod" might refer to hardware resources that might be the customer device version of hardware resources that may be found in a service provider NFVI (which are referred to herein as pods, and might be embodied in the service provider NFVI as one or more racks of equipment or the like). In some embodiments, each pod might represent and/or include physical hardware resources that are part of the NFVI system, or the like. In some cases, each pod might represent a rack of network communications equipment (e.g., compute resource, storage resource, etc.) within a telecommunications facility (in this case, a CO or BBU hotel that is associated with a wireless communications or cellular service provider or the like. According to some embodiments, the one or more pods 620 might allow the wireless communications or cellular service provider or the like to internally burst at least one PTP timing signal among its own physical or virtual hardware resources. In some cases, specific timing virtual machines ("VMs") might be created in every pod 620 (at least 2 for redundancy) that might serve as virtual slave clocks. The grand master clocks 610 deliver accurate timing to every pod 620 via direct optical Ethernet path or the like, and each timing VM provides timing signals to the one or more vBBUs 630' within the pod, which in turn forward the timing signals to the backhaul and/or to the fronthaul (including RRHs or the like). In some cases, every pod 620 might have a priority network (e.g., timing only priority network or the like) that provides virtual PTP synchronization and/or timing to every vBBU 630' within the pod 620. Virtual hosted network elements like the vBBUs 630' can consume time synchronization directly.

The first grand master clock 405a, the second grand master clock 405b, the GPS antennas 615, and the BBUs 630 (or vBBUs 630') of system 600 (and 600') might otherwise be similar, if not identical, to the first grand master clock 105a, the second grand master clock 105b, the GPS antennas 120b, and the network node 160 of system 100 of FIG. 1, respectively, and the descriptions of these components of system 100 are applicable to the corresponding components of system 600, respectively.

Figure 7A:
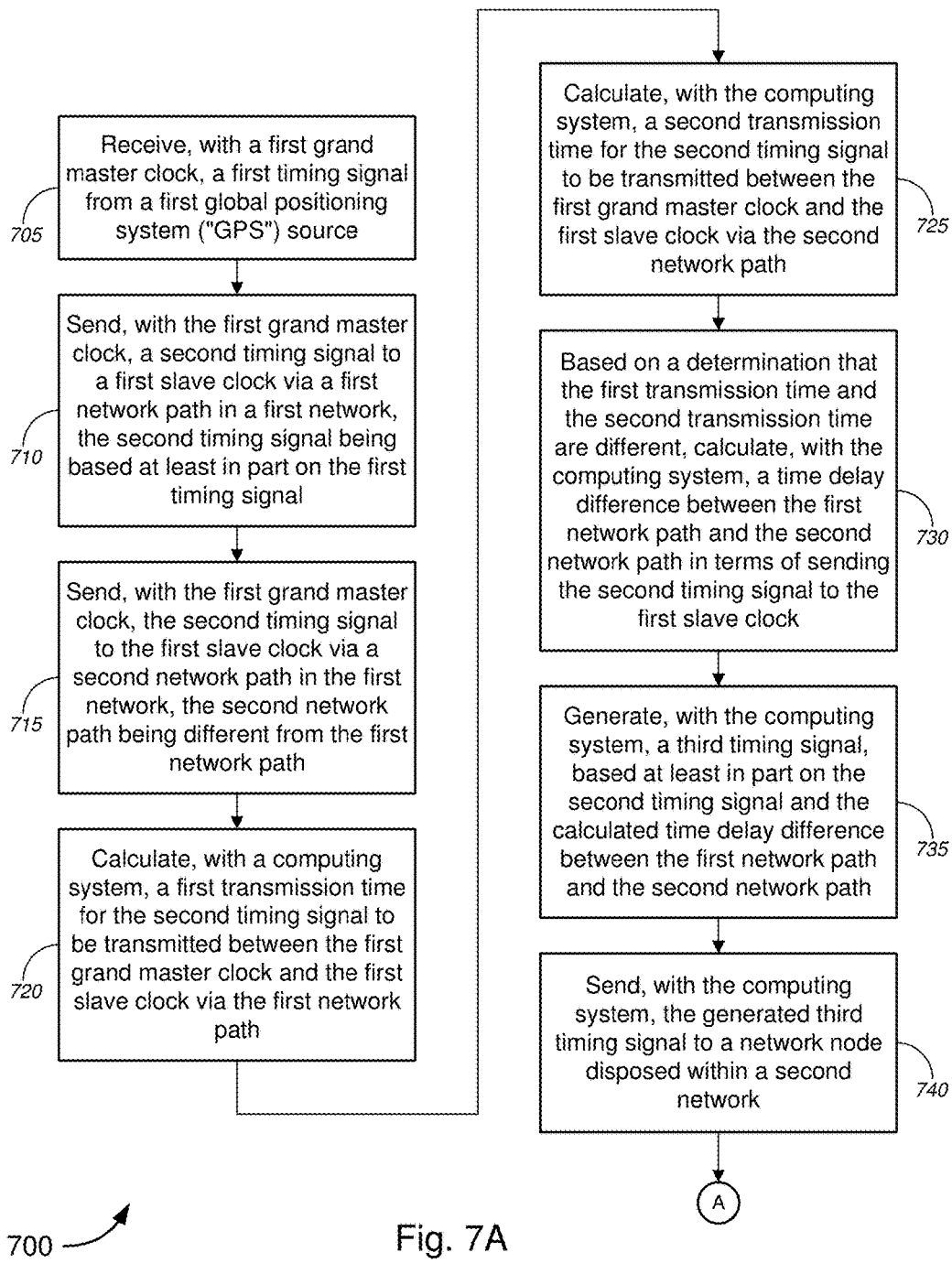

FIGS. 7A and 7B (collectively, "FIG. 7") are flow diagrams illustrating a method 700 for implementing ASaaS functionality, in accordance with various embodiments. Method 700 in FIG. 7A continues onto FIG. 7B following the circular marker denoted, "A."

While the techniques and procedures are depicted and/or described in a certain order for purposes of illustration, it should be appreciated that certain procedures may be reordered and/or omitted within the scope of various embodiments. Moreover, while the method 700 illustrated by FIG. 7 can be implemented by or with (and, in some cases, are described below with respect to) the systems 100, 200, 300, 400, 500, 600, and 600' of FIGS. 1, 2, 3, 4, 5, 6A, and 6B respectively (or components thereof), such methods may also be implemented using any suitable hardware (or software) implementation. Similarly, while each of the systems 100, 200, 300, 400, 500, 600, and 600' of FIGS. 1, 2, 3, 4, 5, 6A, and 6B, respectively (or components thereof), can operate according to the method 700 illustrated by FIG. 7 (e.g., by executing instructions embodied on a computer readable medium), the systems 100, 200, 300, 400, 500, 600, and 600' of FIGS. 1, 2, 3, 4, 5, 6A, and 6B can each also operate according to other modes of operation and/or perform other suitable procedures.

In the embodiment of FIG. 7A, method 700 might comprise receiving, with a first grand master clock (which might correspond to first grand master clocks 105a, 215a, 310a, 410a, 520, and 610a of FIGS. 1-6, or the like), a first timing signal (which might correspond to timing signal 110a of FIG. 1, or the like) from a first global positioning system ("GPS") source (which might correspond to GPS source 115a of FIG. 1, or the like) (block 705), sending, with the first grand master clock, a second timing signal (which might correspond to timing signals 125a, 140, 140a, and/or 140c of FIG. 1, or the like) to a first slave clock (which might correspond to first slave clocks 145a, 225a, 345a, 445a, and 530a of FIGS. 1-5, or the like) via a first network path in a first network (which might correspond to networks 135, 325, and 430 of FIGS. 1, 3, and 4, or the like), the second timing signal being based at least in part on the first timing signal (block 710), and sending, with the first grand master clock, the second timing signal to the first slave clock via a second network path in the first network, the second network path being different from the first network path (block 715).

Method 700 might further comprise calculating, with a computing system (which might correspond to computing system 130 of FIG. 1, or the like), a first transmission time for the second timing signal to be transmitted between the first grand master clock and the first slave clock via the first network path (block 720) and calculating, with the computing system, a second transmission time for the second timing signal to be transmitted between the first grand master clock and the first slave clock via the second network path (block 725). In some embodiments, the computing system might include, but is not limited to, one of a server computer, a network node, a gateway device, a router, a switch, the first and/or second master clock, and/or the like.

At block 730, method 700 might comprise, based on a determination that the first transmission time and the second transmission time are different, calculating, with the computing system, a time delay difference between the first network path and the second network path in terms of sending the second timing signal to the first slave clock. Method 700, at block 735, might comprise generating, with the computing system, a third timing signal, based at least in part on the second timing signal and the calculated time delay difference between the first network path and the second network path. Method 700 might further comprise, at block 740, sending, with the computing system, the generated third timing signal to a network node (which might correspond to network node 160 of FIG. 1, or the like) disposed within a second network (which might correspond to network 150 of FIG. 1, or the like). In some cases, the network node might include, without limitation, at least one of one or more network elements, one or more base band units ("BBUs"), one or more computing systems, and/or the like. The one or more network elements might include, but are not limited to, network switches, network nodes, network routers, gateway devices, and/or the like (similar to nodes or network elements 175a-175n, 210a-210d, 320, 330, 420, and 425 of FIGS. 1-4, or the like). The one or more BBUs (which might correspond to BBUs 240, 350, 450, 535, 535a-535n, 630, and 630a-630n, and virtual BBUs 630' and 630a'-630n' of FIGS. 1-6, or the like) might comprise cellular BBUs, wireless communications BBUs, and/or the like. According to some embodiments, sending the generated third timing signal to the network node might comprise sending, with the computing system, the generated third timing signal to the network node disposed within the second network via optical fiber communication between the computing system and the network node. Method 700 might proceed to block 745 as shown in FIG. 7B following the circular marker denoted, "A."

In FIG. 7B, at block 745, method 700 might comprise receiving, with a second grand master clock (which might correspond to second grand master clocks 105b, 215b, 310b, 410b, and 610b of FIGS. 1-4 and 6, or the like), a fourth timing signal (which might correspond to timing signal 110b of FIG. 1, or the like) from at least one of the first GPS source or a second GPS source (which might correspond to GPS source 115b of FIG. 1, or the like). Method 700 might further comprise sending, with the second grand master clock, a fifth timing signal (which might correspond to timing signals 125b, 140, 140b, and/or 140d of FIG. 1, or the like) to a second slave clock (which might correspond to second slave clocks 145b, 225b, 345b, 445b, and 530b of FIGS. 1-5, or the like) via a third network path in the first network, the fifth timing signal being based at least in part on the fourth timing signal (block 750), sending, with the second grand master clock, the fifth timing signal to the second slave clock via a fourth network path in the first network (block 755), calculating, with the computing system, a third transmission time for the fifth timing signal to be transmitted between the second grand master clock and the second slave clock via the third network path (block 760), and calculating, with the computing system, a fourth transmission time for the fifth timing signal to be transmitted between the second grand master clock and the second slave clock via the fourth network path (block 765).

In some embodiments, the third network path might be different from any of the first network path or the second network path, while the fourth network path might be different from any of the first network path, the second network path, or the third network path. According to some embodiments, the first network path might comprise a first sequence of a first plurality of network elements through which the second timing signal is sent, while the second network path might comprise a second sequence of the same first plurality of network elements through which the second timing signal is sent, and the second sequence might be the opposite of the first sequence. In other words, in such embodiments, sending the timing signal along the first network path might comprise sending from the master clock to the slave clock, while sending the timing signal along the second network path might comprise sending along a return path from the slave clock to the master clock, or vice versa, where timing signal passes along the same network elements except in the reverse order along the return path. In a similar manner, the third network path might comprise a third sequence of a second plurality of network elements through which the fifth timing signal is sent, while the fourth network path might comprise a fourth sequence of the same second plurality of network elements through which the fifth timing signal is sent, and the fourth sequence might be the opposite of the third sequence. In other words, in such embodiments, sending the timing signal along the third network path might comprise sending from the master clock to the slave clock, while sending the timing signal along the fourth network path might comprise sending along a return path from the slave clock to the master clock, or vice versa, where timing signal passes along the same network elements except in the reverse order along the return path.

Method 700, at block 770, might comprise, based on a determination that the third transmission time and the fourth transmission time are different, calculating, with the computing system, a time delay difference between the third network path and the fourth network path in terms of sending the fifth timing signal to the second slave clock. At block 775, method 700 might comprise generating, with the computing system, a sixth timing signal, based at least in part on the fifth timing signal and the calculated time delay difference between the third network path and the fourth network path and based at least in part on the second timing signal and the calculated time delay difference between the first network path and the second network path. Method 700 might further comprise, at block 780, sending, with the computing system, the generated sixth timing signal to the network node disposed within the second network.

In some embodiments, the first network path and the second network path (as well as the third network path and the fourth network path) might each comprise open systems interconnection ("OSI") model layer 1 network devices, and the first grand master clock might be communicatively coupled with a reconfigurable optical add-drop multiplexer ("ROADM"), which might utilize at least one of dense wavelength division multiplexing ("DWDM") and/or coarse wavelength division multiplexing ("CWDM") techniques, or the like. Alternatively, or additionally, the first network path and the second network path (as well as the third network path and the fourth network path) might each comprise OSI model layer 2 network devices and switches, and the first grand master clock might be disposed within a service provider central office in the first network. Alternatively, or additionally, the first network path and the second network path (as well as the third network path and the fourth network path) might each comprise OSI model layer 3 network devices, routers, and switches, and the first grand master clock might also be disposed within a service provider central office in the first network. In some cases, each of the first network path and the second network path (as well as each of the third network path and the fourth network path) might be static network paths. With the physical paths and routes being the same (or static), the highest quality of services to transport timing information can be achieved, while ensuring the smallest levels of variations in the delay—along either direction. The use of two master clocks and two slave clocks, in some embodiments, provide redundancy. In some aspects, the two paths master clocks-to-slave clocks remain independent and fixed in time.

According to some embodiments, at least the third timing signal and the sixth timing signal (and in some cases, at least one of the first, second, fourth, and/or fifth timing signals, as well) each comprises a precision time protocol ("PTP") timing signal, which includes, without limitation, frequency information, phase information, time of day information, and/or the like.

In some embodiments, the second network might be a wireless carrier network associated with a wireless carrier, and the network node might comprise at least one base band unit ("BBU"). The first slave clock (and, in some cases, the second slave clock, as well) and the at least one BBU might be disposed within at least one of a central office or a BBU hotel associated with the wireless carrier (as shown, e.g., in the embodiments of FIGS. 2-5, or the like), and the PTP timing signal might be used to provide timing and synchronization between backhaul and fronthaul networks associated with the wireless carrier.

In some instances, such as shown in the embodiments of FIGS. 5 and 6, the first network and the second network might be the same network, and the first grand master clock (as shown in FIG. 5; and, in some cases, the second grand master clock as well, as shown in FIG. 6) might be disposed within the at least one of the central office or the BBU hotel associated with the wireless carrier. In such embodiments, the at least one of the central office or the BBU hotel might comprise at least one rooftop cable penetration (one in the embodiment of FIG. 5, and two in the embodiment of FIG. 6) through which a cable provides the first timing signal to the first grand master clock (and/or the second grand master clock), via an optical converter, from at least one GPS antenna (one in the embodiment of FIG. 5, and two in the embodiment of FIG. 6) that communicatively couples to the first GPS source.

According to some embodiments, the PTP timing signal might be a virtual PTP timing signal, where the at least one BBU might comprise at least one virtual BBU ("vBBU") (as shown, e.g., in the embodiment of FIG. 6B, or the like). In some instances, the first slave clock (and/or the second slave clock) might comprise a timing virtual machine ("VM") that is created in each of at least one pod. The first grand master clock (and, in some cases, the second grand master clock, as well) and the at least one pod might be disposed within the at least one of the central office or the BBU hotel associated with the wireless carrier. In some cases, the first grand master clock (and/or the second grand master clock) might communicatively couple with the at least one pod via optical fiber communication (e.g., fiber optic gigabit Ethernet communication, or the like). Like some of the above-mentioned embodiments, the at least one of the central office or the BBU hotel might comprise at least one rooftop cable penetration (one in the embodiment of FIG. 5, and two in the embodiment of FIG. 6) through which a cable provides the first timing signal to the first grand master clock from at least one GPS antenna that communicatively couples to the first GPS source. In some instances, the at least one vBBU might receive time information as well as time synchronization, via the virtual PTP timing signal, directly from the at least one pod.

Exemplary System and Hardware Implementation

Figure 8:
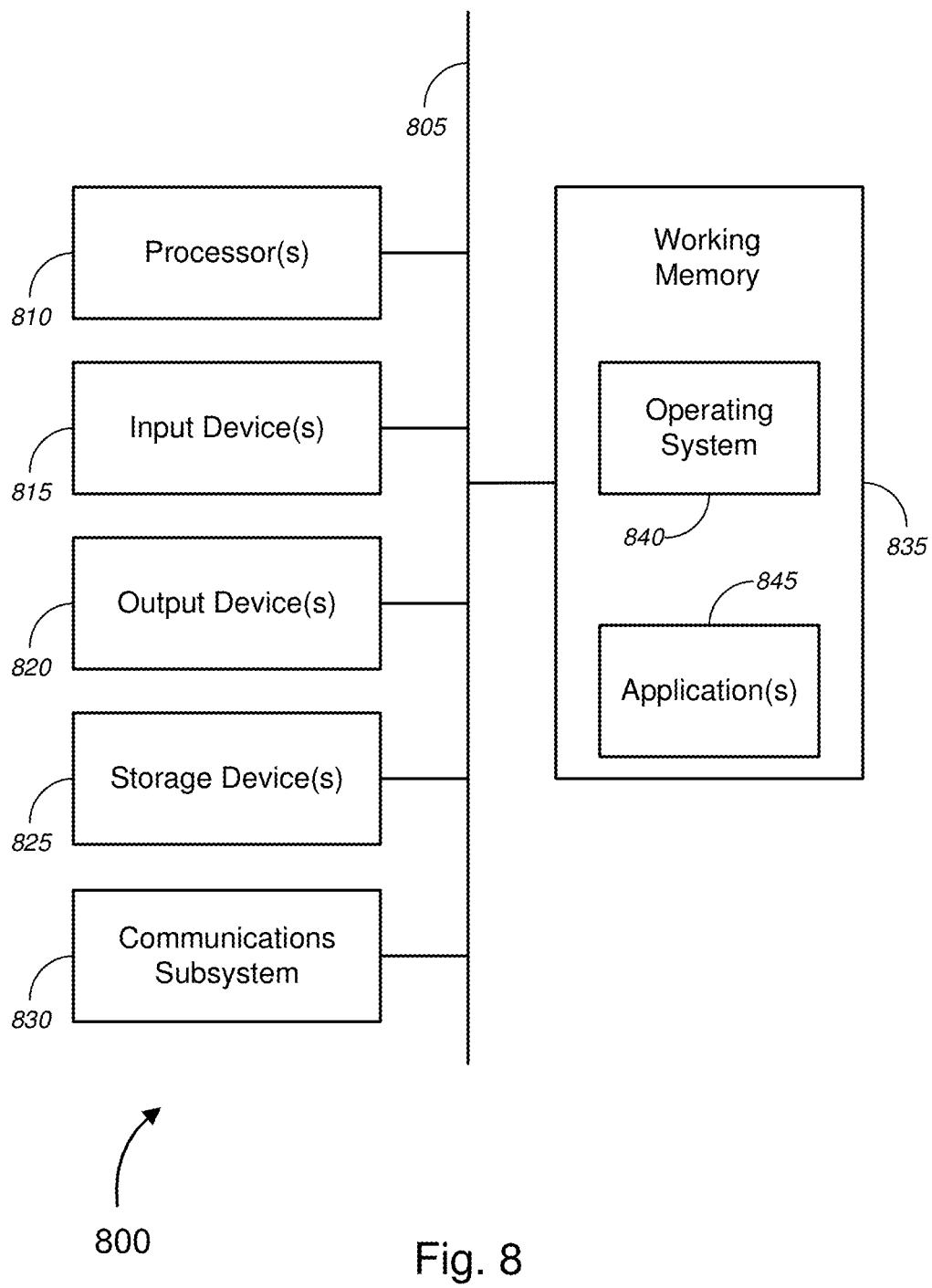
FIG. 8 is a block diagram illustrating an exemplary computer or system hardware architecture, in accordance with various embodiments.

FIG. 8 is a block diagram illustrating an exemplary computer or system hardware architecture, in accordance with various embodiments. FIG. 8 provides a schematic illustration of one embodiment of a computer system 800 of the service provider system hardware that can perform the methods provided by various other embodiments, as described herein, and/or can perform the functions of computer or hardware system (i.e., grand master clocks 105a, 105b, 215a, 215b, 310a, 310b, 410a, 410b, 520, 610a, and 610b, computing system 130, slave clocks 145a, 145b, 225a, 225b, 345a, 345b, 445a, 445b, 530a, and 530b, nodes or network elements 160, 175a-175n, 210a-210d, 320, 330, 420, and 425, devices 170a-170n, base band units ("BBUs") 240, 350, 450, 535, 535a-535n, 630, and 630a-630n, and virtual BBUs 630' and 630a'-630n', etc.), as described above. It should be noted that FIG. 8 is meant only to provide a generalized illustration of various components, of which one or more (or none) of each may be utilized as appropriate. FIG. 8, therefore, broadly illustrates how individual system elements may be implemented in a relatively separated or relatively more integrated manner.

The computer or hardware system 800—which might represent an embodiment of the computer or hardware system (i.e., grand master clocks 105a, 105b, 215a, 215b, 310a, 310b, 410a, 410b, 520, 610a, and 610b, computing system 130, slave clocks 145a, 145b, 225a, 225b, 345a, 345b, 445a, 445b, 530a, and 530b, nodes or network elements 160, 175a-175n, 210a-210d, 320, 330, 420, and 425, devices 170a-170n, BBUs 240, 350, 450, 535, 535a-535n, 630, and 630a-630n, and virtual BBUs 630' and 630a'-630n', etc.), described above with respect to FIGS. 1-7—is shown comprising hardware elements that can be electrically coupled via a bus 805 (or may otherwise be in communication, as appropriate). The hardware elements may include one or more processors 810, including, without limitation, one or more general-purpose processors and/or one or more special-purpose processors (such as microprocessors, digital signal processing chips, graphics acceleration processors, and/or the like); one or more input devices 815, which can include, without limitation, a mouse, a keyboard, and/or the like; and one or more output devices 820, which can include, without limitation, a display device, a printer, and/or the like.

The computer or hardware system 800 may further include (and/or be in communication with) one or more storage devices 825, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable, and/or the like. Such storage devices may be configured to implement any appropriate data stores, including, without limitation, various file systems, database structures, and/or the like.

The computer or hardware system 800 might also include a communications subsystem 830, which can include, without limitation, a modem, a network card (wireless or wired), an infra-red communication device, a wireless communication device and/or chipset (such as a Bluetooth™ device, an 802.11 device, a WiFi device, a WiMax device, a WWAN device, a Z-Wave device, a ZigBee device, cellular communication facilities, etc.), and/or the like. The communications subsystem 830 may permit data to be exchanged with a network (such as the network described below, to name one example), with other computer or hardware systems, and/or with any other devices described herein. In many embodiments, the computer or hardware system 800 will further comprise a working memory 835, which can include a RAM or ROM device, as described above.

The computer or hardware system 800 also may comprise software elements, shown as being currently located within the working memory 835, including an operating system 840, device drivers, executable libraries, and/or other code, such as one or more application programs 845, which may comprise computer programs provided by various embodiments (including, without limitation, hypervisors, VMs, and the like), and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 825 described above. In some cases, the storage medium might be incorporated within a computer system, such as the system 800. In other embodiments, the storage medium might be separate from a computer system (i.e., a removable medium, such as a compact disc, etc.), and/or provided in an installation package, such that the storage medium can be used to program, configure, and/or adapt a general purpose computer with the instructions/code stored thereon. These instructions might take the form of executable code, which is executable by the computer or hardware system 800 and/or might take the form of source and/or installable code, which, upon compilation and/or installation on the computer or hardware system 800 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer or hardware system (such as the computer or hardware system 800) to perform methods in accordance with various embodiments of the invention. According to a set of embodiments, some or all of the procedures of such methods are performed by the computer or hardware system 800 in response to processor 810 executing one or more sequences of one or more instructions (which might be incorporated into the operating system 840 and/or other code, such as an application program 845) contained in the working memory 835. Such instructions may be read into the working memory 835 from another computer readable medium, such as one or more of the storage device(s) 825. Merely by way of example, execution of the sequences of instructions contained in the working memory 835 might cause the processor(s) 810 to perform one or more procedures of the methods described herein.

The terms "machine readable medium" and "computer readable medium," as used herein, refer to any medium that participates in providing data that causes a machine to operate in a specific fashion. In an embodiment implemented using the computer or hardware system 800, various computer readable media might be involved in providing instructions/code to processor(s) 810 for execution and/or might be used to store and/or carry such instructions/code (e.g., as signals). In many implementations, a computer readable medium is a non-transitory, physical, and/or tangible storage medium. In some embodiments, a computer readable medium may take many forms, including, but not limited to, non-volatile media, volatile media, or the like. Non-volatile media includes, for example, optical and/or magnetic disks, such as the storage device(s) 825. Volatile media includes, without limitation, dynamic memory, such as the working memory 835. In some alternative embodiments, a computer readable medium may take the form of transmission media, which includes, without limitation, coaxial cables, copper wire and fiber optics, including the wires that comprise the bus 805, as well as the various components of the communication subsystem 830 (and/or the media by which the communications subsystem 830 provides communication with other devices). In an alternative set of embodiments, transmission media can also take the form of waves (including, without limitation, radio, acoustic, and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 810 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer or hardware system 800. These signals, which might be in the form of electromagnetic signals, acoustic signals, optical signals, and/or the like, are all examples of carrier waves on which instructions can be encoded, in accordance with various embodiments of the invention.

The communications subsystem 830 (and/or components thereof) generally will receive the signals, and the bus 805 then might carry the signals (and/or the data, instructions, etc. carried by the signals) to the working memory 835, from which the processor(s) 805 retrieves and executes the instructions. The instructions received by the working memory 835 may optionally be stored on a storage device 825 either before or after execution by the processor(s) 810.

Figure 9:
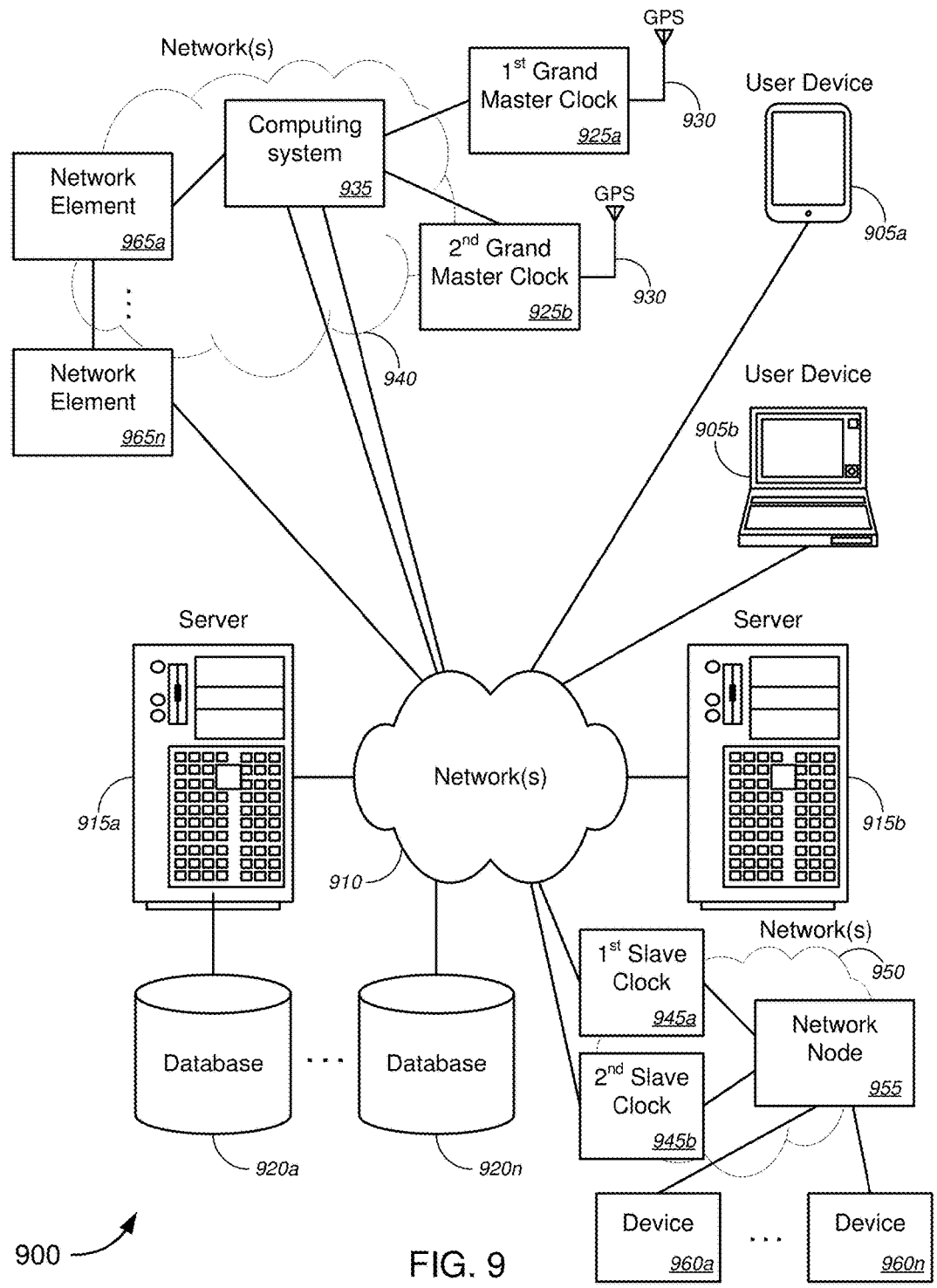
FIG. 9 is a block diagram illustrating an example of a networked system of computers, computing systems, or system hardware architecture, which can be used in accordance with various embodiments.

As noted above, a set of embodiments comprises methods and systems for implementing network timing functionality, and, in particular embodiments, to methods, systems, apparatus, and computer software for implementing Accurate Synchronization as a Service ("ASaaS") functionality. FIG. 9 illustrates a schematic diagram of a system 900 that can be used in accordance with various embodiments. The system 900 can each include one or more user computers, user devices, or customer devices 905. A user computer, user device, or customer device 905 can be a general purpose personal computer (including, merely by way of example, desktop computers, tablet computers, laptop computers, handheld computers, and the like, running any appropriate operating system, several of which are available from vendors such as Apple, Microsoft Corp., and the like), cloud computing devices, a server(s), and/or a workstation computer(s) running any of a variety of commercially-available UNIX™ or UNIX-like operating systems. A user computer, user device, or customer device 905 can also have any of a variety of applications, including one or more applications configured to perform methods provided by various embodiments (as described above, for example), as well as one or more office applications, database client and/or server applications, and/or web browser applications. Alternatively, a user computer, user device, or customer device 905 can be any other electronic device, such as a thin-client computer, Internet-enabled mobile telephone, and/or personal digital assistant, capable of communicating via a network (e.g., the network(s) 910 described below) and/or of displaying and navigating web pages or other types of electronic documents. Although the exemplary system 900 is shown with two user computers, user devices, or customer devices 905, any number of user computers, user devices, or customer devices can be supported.

Certain embodiments operate in a networked environment, which can include a network(s) 910. The network(s) 910 can be any type of network familiar to those skilled in the art that can support data communications using any of a variety of commercially-available (and/or free or proprietary) protocols, including, without limitation, TCP/IP, SNA™, IPX™, AppleTalk™, and the like. Merely by way of example, the network(s) 910 (similar to networks 135 of FIGS. 1 and 2, or the like), as well as the network 940 (similar to networks 135, 325, and 430 of FIGS. 1, 3, and 4, or the like) and network 950 (similar to network 150 of FIG. 1, or the like), can each include a local area network ("LAN"), including, without limitation, a fiber network, an Ethernet network, a Token-Ring™ network, and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, the Z-Wave protocol known in the art, the ZigBee protocol or other IEEE 802.15.4 suite of protocols known in the art, and/or any other wireless protocol; and/or any combination of these and/or other networks. In a particular embodiment, the network might include an access network of the service provider (e.g., an Internet service provider ("ISP")). In another embodiment, the network might include a core network of the service provider, and/or the Internet.

Embodiments can also include one or more server computers 915. Each of the server computers 915 may be configured with an operating system, including, without limitation, any of those discussed above, as well as any commercially (or freely) available server operating systems. Each of the servers 915 may also be running one or more applications, which can be configured to provide services to one or more clients 905 and/or other servers 915.

Merely by way of example, one of the servers 915 might be a data server, a web server, a cloud computing device(s), or the like, as described above. The data server might include (or be in communication with) a web server, which can be used, merely by way of example, to process requests for web pages or other electronic documents from user computers 905. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 905 to perform methods of the invention.

The server computers 915, in some embodiments, might include one or more application servers, which can be configured with one or more applications accessible by a client running on one or more of the client computers 905 and/or other servers 915. Merely by way of example, the server(s) 915 can be one or more general purpose computers capable of executing programs or scripts in response to the user computers 905 and/or other servers 915, including, without limitation, web applications (which might, in some cases, be configured to perform methods provided by various embodiments). Merely by way of example, a web application can be implemented as one or more scripts or programs written in any suitable programming language, such as Java™, C, C#™ or C++, and/or any scripting language, such as Perl, Python, or TCL, as well as combinations of any programming and/or scripting languages. The application server(s) can also include database servers, including, without limitation, those commercially available from Oracle™, Microsoft™, Sybase™, IBM™, and the like, which can process requests from clients (including, depending on the configuration, dedicated database clients, API clients, web browsers, etc.) running on a user computer, user device, or customer device 905 and/or another server 915. In some embodiments, an application server can perform one or more of the processes for implementing network timing functionality, and, in particular embodiments, to methods, systems, apparatus, and computer software for implementing Accurate Synchronization as a Service ("ASaaS") functionality, or the like, as described in detail above. Data provided by an application server may be formatted as one or more web pages (comprising HTML, JavaScript, etc., for example) and/or may be forwarded to a user computer 905 via a web server (as described above, for example). Similarly, a web server might receive web page requests and/or input data from a user computer 905 and/or forward the web page requests and/or input data to an application server. In some cases, a web server may be integrated with an application server.

In accordance with further embodiments, one or more servers 915 can function as a file server and/or can include one or more of the files (e.g., application code, data files, etc.) necessary to implement various disclosed methods, incorporated by an application running on a user computer 905 and/or another server 915. Alternatively, as those skilled in the art will appreciate, a file server can include all necessary files, allowing such an application to be invoked remotely by a user computer, user device, or customer device 905 and/or server 915.

It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 920a-920n (collectively, "databases 920"). The location of each of the databases 920 is discretionary: merely by way of example, a database 920a might reside on a storage medium local to (and/or resident in) a server 915a (and/or a user computer, user device, or customer device 905). Alternatively, a database 920n can be remote from any or all of the computers 905, 915, so long as it can be in communication (e.g., via the network 910) with one or more of these. In a particular set of embodiments, a database 920 can reside in a storage-area network ("SAN") familiar to those skilled in the art. (Likewise, any necessary files for performing the functions attributed to the computers 905, 915 can be stored locally on the respective computer and/or remotely, as appropriate.) In one set of embodiments, the database 920 can be a relational database, such as an Oracle database, that is adapted to store, update, and retrieve data in response to SQL-formatted commands. The database might be controlled and/or maintained by a database server, as described above, for example.

With reference to FIG. 9, according to some embodiments, system 900 might further comprise a first grand master clock 925a and a second grand master clock 925b (similar to grand master clocks 105a, 105b, 215a, 215b, 310a, 310b, 410a, 410b, 520, 610a, and 610b of FIGS. 1-6, or the like), each communicatively coupled to a global positioning system ("GPS") antenna (similar to GPS antennas 120b, 220, 315, 415, 515, and 615 of FIGS. 1-6, or the like). System 900 might further comprise a computing system 935 (similar to computing system 130 of FIG. 1, or the like) in a network(s) 940 (similar to networks 135, 325, and 430 of FIGS. 1, 3, and 4, or the like). In some embodiments, the computing system 935 might include, but is not limited to, one of a server computer, a network node, a gateway device, a router, a switch, the first and/or second master clock, and/or the like. System 900 might also comprise a first slave clock 945a and a second slave clock 945b (similar to slave clocks 145a, 145b, 225a, 225b, 345a, 345b, 445a, 445b, 530a, and 530b of FIGS. 1-5, or the like), both disposed within network(s) 950 (similar to network 150 of FIG. 1, or the like). System 900 might further comprise one or more network nodes 955 (similar to network node 160 of FIG. 1, or the like) and one or more devices 960a-960n (collectively, "devices 960") that may either be disposed within network(s) 950 or communicatively coupled to network(s) 950. In some cases, system 900 might further comprise one or more network elements 965a-965n (collectively, "network elements 965") that may be disposed within network(s) 940. In some embodiments, the devices 960 (similar to devices 170a-170n, base band units ("BBUs") 240, 350, 450, 535, 535a-535n, 630, and 630a-630n, and virtual BBUs 630' and 630a'-630n' of FIGS. 1-6, or the like) might include, but are not limited to, one or more BBUs, one or more remote radio heads ("RRHs"), one or more other network elements, or any other devices that utilize timing signals, and/or the like. According to some embodiments, the network elements 965 (similar to nodes or network elements 175a-175n, 210a-210d, 320, 330, 420, and 425 of FIGS. 1-4, or the like) or the one or more other network elements might include, without limitation, network switches, network nodes, network routers, gateway devices, and/or the like.

In operation, the first grand master clock 925a might receive a first timing signal from a GPS source (not shown) via GPS antenna 930, and might send a second timing signal (which is based at least in part on the first timing signal) to computing system 935 in network(s) 940. In some cases, the second grand master clock 925b might likewise receive a third timing signal from a GPS source (also not shown; which could be the same GPS source as that for the first timing signal or a different GPS source) via GPS antenna 930, and might send a fourth timing signal (which is based at least in part on the third timing signal) to the computing system 935. The computing system 935 might send the second timing signal to the first slave clock 945a via a first network path (similar to path 340a or 440a of FIG. 3 or 4, or the like) and might send the fourth timing signal to the second slave clock 945b via a second network path (similar to path 340b or 440b of FIG. 3 or 4, or the like), both via network(s) 910. The computing system 935 might calculate a first transmission time for the second timing signal to be transmitted between the first grand master clock 925a and the first slave clock 945a via the first network path, might calculate a second transmission time for the second timing signal to be transmitted between the second grand master clock 925b and the second slave clock 945b via the second network path, and might, based on a determination that the first transmission time and the second transmission time are different, calculate a first time delay difference between the first network path and the second network path in terms of sending the timing signals to the slave clocks. In some embodiments, the computing system 935 might additionally calculate a third transmission time for the second timing signal to be transmitted along a first return path from the first slave clock 945a to the first grand master clock 925a, and might, based on a determination that the first transmission time and the third transmission time are different, calculate a second time delay difference between the first network path and the first return path in terms of sending the timing signals to/from the first slave clock. Similarly, the computing system 935 might additionally calculate a fourth transmission time for the fourth timing signal to be transmitted along a second return path from the second slave clock 945b to the second grand master clock 925b, and might, based on a determination that the second transmission time and the fourth transmission time are different, calculate a third time delay difference between the second network path and the second return path in terms of sending the timing signals to/from the second slave clock. The computing system might subsequently generate a fifth timing signal, which might be based at least in part on one or more of the second timing signal, the fourth timing signal, the first time delay difference, the second time delay difference, and/or the third time delay difference, or the like. The computing system might then send the generated fifth timing signal to the network node 955, and the fifth timing signal may be used by devices 960 for timing and synchronization purposes. In some cases, the network node 955 might include one or more BBUs, while the devices 960 might include, without limitation, one or more RRHs or other fronthaul network elements, one or more backhaul network elements, and/or the like. According to some embodiments, at least one of the second timing signal, the fourth timing signal, and/or the fifth timing signal might be a precision time protocol ("PTP") timing signal, which might comprise at least frequency information, phase information, and time of day information.

These and other functions of the system 900 (and its components) are described in greater detail above with respect to FIGS. 1-7.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A method for implementing accurate synchronization as a service ("ASaaS") functionality, comprising:
    receiving, with a first grand master clock, a first timing signal from a first global positioning system ("GPS") source;
    sending, with the first grand master clock, a second timing signal to a first slave clock via a first network path in a first network, the second timing signal being based at least in part on the first timing signal;
    sending, with the first grand master clock, the second timing signal to the first slave clock via a second network path in the first network, the second network path being different from the first network path;
    calculating, with a computing system, a first transmission time for the second timing signal to be transmitted between the first grand master clock and the first slave clock via the first network path;
    calculating, with the computing system, a second transmission time for the second timing signal to be transmitted between the first grand master clock and the first slave clock via the second network path;
    based on a determination that the first transmission time and the second transmission time are different, calculating, with the computing system, a time delay difference between the first network path and the second network path in terms of sending the second timing signal to the first slave clock;
    generating, with the computing system, a third timing signal, based at least in part on the second timing signal and the calculated time delay difference between the first network path and the second network path; and
    sending, with the computing system, the generated third timing signal to a network node disposed within a second network.

2. The method of claim 1, wherein the third timing signal comprises a precision time protocol ("PTP") timing signal, the PTP timing signal comprising frequency information, phase information, and time of day information.

3. The method of claim 2, wherein the second network is a wireless carrier network associated with a wireless carrier, wherein the network node comprises at least one base band unit ("BBU"), wherein the first slave clock and the at least one BBU are disposed within at least one of a central office or a BBU hotel associated with the wireless carrier, and wherein the PTP timing signal is used to provide timing and synchronization between backhaul and fronthaul networks associated with the wireless carrier.

4. The method of claim 3, wherein the first network and the second network are the same network, wherein the first grand master clock is disposed within the at least one of the central office or the BBU hotel associated with the wireless carrier, and wherein the at least one of the central office or the BBU hotel comprises at least one rooftop cable penetration through which a cable provides the first timing signal to the first grand master clock, via an optical converter, from at least one GPS antenna that communicatively couples to the first GPS source.

5. The method of claim 3, wherein the PTP timing signal is a virtual PTP timing signal, wherein the at least one BBU comprises at least one virtual BBU ("vBBU"), wherein the first slave clock comprises a timing virtual machine ("VM") that is created in each of at least one pod, wherein the first grand master clock and the at least one pod are disposed within the at least one of the central office or the BBU hotel associated with the wireless carrier, wherein the first grand master clock communicatively couples with the at least one pod via optical fiber communication, wherein the at least one of the central office or the BBU hotel comprises at least one rooftop cable penetration through which a cable provides the first timing signal to the first grand master clock from at least one GPS antenna that communicatively couples to the first GPS source, and wherein the at least one vBBU receives time information and time synchronization, via the virtual PTP timing signal, directly from the at least one pod.

6. The method of claim 1, further comprising:
    receiving, with a second grand master clock, a fourth timing signal from at least one of the first GPS source or a second GPS source;
    sending, with the second grand master clock, a fifth timing signal to a second slave clock via a third network path in the first network, the fifth timing signal being based at least in part on the fourth timing signal, the third network path being different from any of the first network path or the second network path;
    sending, with the second grand master clock, the fifth timing signal to the second slave clock via a fourth network path in the first network, the fourth network path being different from any of the first network path, the second network path, or the third network path;
    calculating, with the computing system, a third transmission time for the fifth timing signal to be transmitted between the second grand master clock and the second slave clock via the third network path;
    calculating, with the computing system, a fourth transmission time for the fifth timing signal to be transmitted between the second grand master clock and the second slave clock via the fourth network path;
    based on a determination that the third transmission time and the fourth transmission time are different, calculating, with the computing system, a time delay difference between the third network path and the fourth network path in terms of sending the fifth timing signal to the second slave clock;
    generating, with the computing system, a sixth timing signal, based at least in part on the fifth timing signal and the calculated time delay difference between the third network path and the fourth network path and based at least in part on the second timing signal and the calculated time delay difference between the first network path and the second network path; and
    sending, with the computing system, the generated sixth timing signal to the network node disposed within the second network.

7. The method of claim 6, wherein the first network path comprises a first sequence of a first plurality of network elements through which the second timing signal is sent, the second network path comprises a second sequence of the same first plurality of network elements through which the second timing signal is sent, and the second sequence is the opposite of the first sequence; and wherein the third network path comprises a third sequence of a second plurality of network elements through which the fifth timing signal is sent, the fourth network path comprises a fourth sequence of the same second plurality of network elements through which the fifth timing signal is sent, and the fourth sequence is the opposite of the third sequence.

8. The method of claim 1, wherein the first network path and the second network path each comprises at least one of open systems interconnection ("OSI") model layer 3 network devices, routers, and switches or OSI model layer 2 network devices and switches, wherein the first grand master clock is disposed within a service provider central office in the first network.

9. The method of claim 1, wherein the first network path and the second network path each comprises OSI model 1 network devices, wherein the first grand master clock is communicatively coupled with a reconfigurable optical add-drop multiplexer ("ROADM").

10. The method of claim 1, wherein sending the generated third timing signal to the network node comprises sending, with the computing system, the generated third timing signal to the network node disposed within the second network via optical fiber communication between the computing system and the network node.

11. The method of claim 1, wherein each of the first network path and the second network path are static network paths.

12. A system for implementing accurate synchronization as a service ("ASaaS") functionality, comprising:
a first grand master clock, comprising:
at least one first processor; and
a first non-transitory computer readable medium communicatively coupled to the at least one first processor, the first non-transitory computer readable medium having stored thereon computer software comprising a first set of instructions that, when executed by the at least one first processor, causes the first grand master clock to:
receive a first timing signal from a first global positioning system ("GPS") source;
send a second timing signal to a first slave clock via a first network path in a first network, the second timing signal being based at least in part on the first timing signal; and
send the second timing signal to the first slave clock via a second network path in the first network, the second network path being different from the first network path;
a computing system, comprising:
at least one second processor; and
a second non-transitory computer readable medium communicatively coupled to the at least one second processor, the second non-transitory computer readable medium having stored thereon computer software comprising a second set of instructions that, when executed by the at least one second processor, causes the computing system to:
calculate a first transmission time for the second timing signal to be transmitted between the first grand master clock and the first slave clock via the first network path;
calculate a second transmission time for the second timing signal to be transmitted between the first grand master clock and the first slave clock via the second network path;
based on a determination that the first transmission time and the second transmission time are different, calculate a time delay difference between the first network path and the second network path in terms of sending the second timing signal to the first slave clock;
generate a third timing signal, based at least in part on the second timing signal and the calculated time delay difference between the first network path and the second network path; and
send the generated third timing signal to a network node disposed within a second network.

13. The system of claim 12, wherein the third timing signal comprises a precision time protocol ("PTP") timing signal, the PTP timing signal comprising frequency information, phase information, and time of day information.

14. The system of claim 13, wherein the second network is a wireless carrier network associated with a wireless carrier, wherein the network node comprises at least one base band unit ("BBU"), wherein the first slave clock and the at least one BBU are disposed within at least one of a central office or a BBU hotel associated with the wireless carrier, and wherein the PTP timing signal is used to provide timing and synchronization between backhaul and fronthaul networks associated with the wireless carrier.

15. The system of claim 14, wherein the first network and the second network are the same network, wherein the first grand master clock is disposed within the at least one of the central office or the BBU hotel associated with the wireless carrier, and wherein the at least one of the central office or the BBU hotel comprises at least one rooftop cable penetration through which a cable provides the first timing signal to the first grand master clock, via an optical converter, from at least one GPS antenna that communicatively couples to the first GPS source.

16. The system of claim 15, wherein the PTP timing signal is a virtual PTP timing signal, wherein the at least one BBU comprises at least one virtual BBU ("vBBU"), wherein the first slave clock comprises a timing virtual machine ("VM") that is created in each of at least one pod, wherein the first grand master clock and the at least one pod are disposed within the at least one of the central office or the BBU hotel associated with the wireless carrier, wherein the first grand master clock communicatively couples with the at least one pod via optical fiber communication, wherein the at least one of the central office or the BBU hotel comprises at least one rooftop cable penetration through which a cable provides the first timing signal to the first grand master clock from at least one GPS antenna that communicatively couples to the first GPS source, and wherein the at least one vBBU receives time synchronization, via the virtual PTP timing signal, directly from the at least one pod.

17. The system of claim 13, further comprising:
a second grand master clock, comprising:
at least one third processor; and
a third non-transitory computer readable medium communicatively coupled to the at least one third processor, the third non-transitory computer readable medium having stored thereon computer software comprising a third set of instructions that, when executed by the at least one third processor, causes the second grand master clock to:
    receive a fourth timing signal from at least one of the first GPS source or a second GPS source;
    send a fifth timing signal to a second slave clock via a third network path in the first network, the fifth timing signal being based at least in part on the fourth timing signal, the third network path being different from any of the first network path or the second network path; and
    send the fifth timing signal to the second slave clock via a fourth network path in the first network, the fourth network path being different from any of the first network path, the second network path, or the third network path;
wherein the second set of instructions, when executed by the at least one second processor, further causes the computing system to:
    calculate a third transmission time for the fifth timing signal to be transmitted between the second grand master clock and the second slave clock via the third network path;
    calculate a fourth transmission time for the fifth timing signal to be transmitted between the second grand master clock and the second slave clock via the fourth network path;
    based on a determination that the third transmission time and the fourth transmission time are different, calculate a time delay difference between the third network path and the fourth network path in terms of sending the fifth timing signal to the second slave clock;
    generate a sixth timing signal, based at least in part on the fifth timing signal and the calculated time delay difference between the third network path and the fourth network path and based at least in part on the second timing signal and the calculated time delay difference between the first network path and the second network path; and
    send the generated sixth timing signal to the network node disposed within the second network.

18. The system of claim 17, wherein the first network path comprises a first sequence of a first plurality of network elements through which the second timing signal is sent, the second network path comprises a second sequence of the same first plurality of network elements through which the second timing signal is sent, and the second sequence is the opposite of the first sequence; and wherein the third network path comprises a third sequence of a second plurality of network elements through which the fifth timing signal is sent, the fourth network path comprises a fourth sequence of the same second plurality of network elements through which the fifth timing signal is sent, and the fourth sequence is the opposite of the third sequence.

19. The system of claim 13, wherein the first network path and the second network path each comprises at least one of open systems interconnection ("OSI") model layer 3 network devices, routers, and switches, or OSI model layer 2 network devices and switches, and wherein the first grand master clock is disposed within a service provider central office in the first network.

20. The system of claim 13, wherein the first network path and the second network path each comprises OSI model layer 1 network devices, and wherein the first grand master clock is communicatively coupled with a reconfigurable optical add-drop multiplexer ("ROADM").

* * * * *